US008477805B2

(12) United States Patent
Sekiya et al.

(10) Patent No.: US 8,477,805 B2
(45) Date of Patent: Jul. 2, 2013

(54) WIRELESS COMMUNICATION APPARATUS AND WIRELESS COMMUNICATION METHOD

(75) Inventors: Masahiro Sekiya, Inagi (JP); Yukimasa Miyamoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 245 days.

(21) Appl. No.: 12/883,766

(22) Filed: Sep. 16, 2010

(65) Prior Publication Data

US 2011/0222487 A1 Sep. 15, 2011

(30) Foreign Application Priority Data

Mar. 12, 2010 (JP) ................................ 2010-056382

(51) Int. Cl.
*H04J 3/16* (2006.01)

(52) U.S. Cl.
USPC .......................................... 370/470; 370/473

(58) Field of Classification Search
USPC ................. 370/329, 394, 470, 472, 474, 476, 370/466, 351, 389; 709/230, 232, 236, 203
See application file for complete search history.

(56) References Cited

U.S. PATENT DOCUMENTS

| | | | | |
|---|---|---|---|---|
| 6,212,190 | B1 * | 4/2001 | Mulligan | 370/400 |
| 7,020,715 | B2 * | 3/2006 | Venkataraman et al. | 709/236 |
| 2003/0181218 | A1 | 9/2003 | Mukai et al. | |
| 2004/0218630 | A1 * | 11/2004 | An | 370/470 |
| 2007/0230381 | A1 | 10/2007 | Matsuoka et al. | |
| 2009/0031054 | A1 | 1/2009 | Kato | |

* cited by examiner

*Primary Examiner* — Dady Chery
(74) *Attorney, Agent, or Firm* — Turocy & Watson, LLP

(57) ABSTRACT

According to one embodiment, a wireless communication apparatus includes a reception unit, a storage unit, a transfer amount decision unit, and a first transfer control unit. The reception unit receives a first frame with a frame length of a first length using a first wireless method. The storage unit stores the first frame. The transfer amount decision unit sets, when a second length decided based on the first wireless method is smaller than the first length, a third length to be the second length, and sets, when the second length is not less than the first length, the third length to be a value not more than the first length. The first transfer control unit transfers transfer information including first information of the third length in the first frame to a first memory, and transfers the first frame by the first length to a second memory.

16 Claims, 18 Drawing Sheets

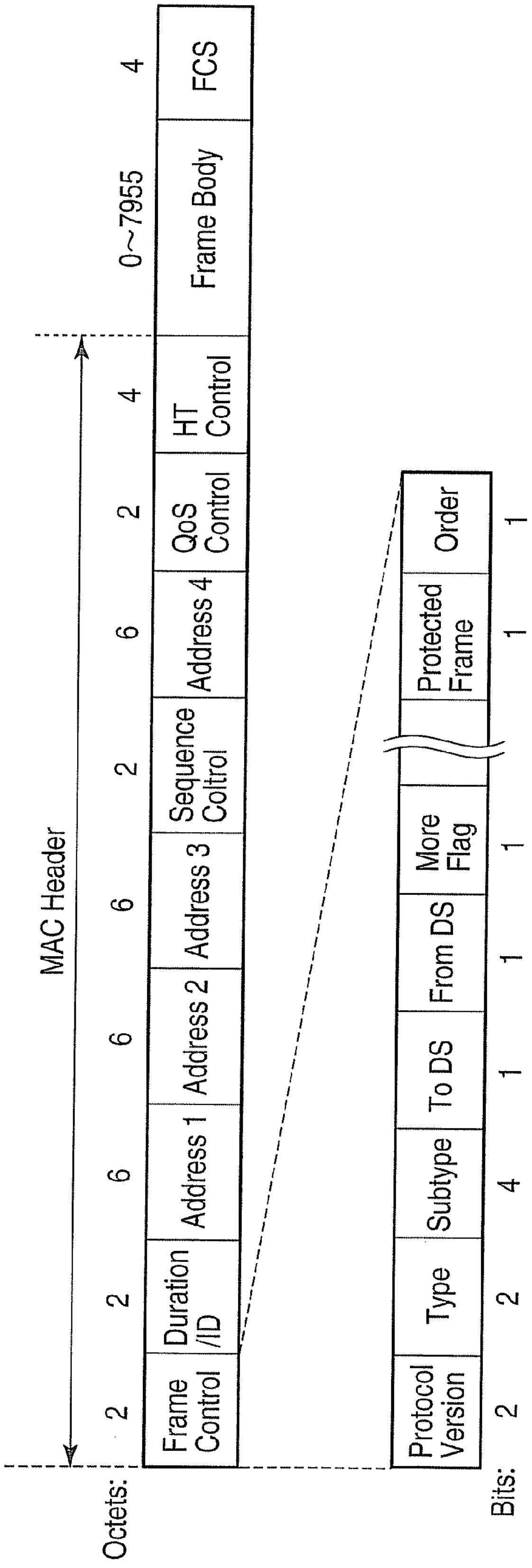
F I G. 3

FIG. 4A

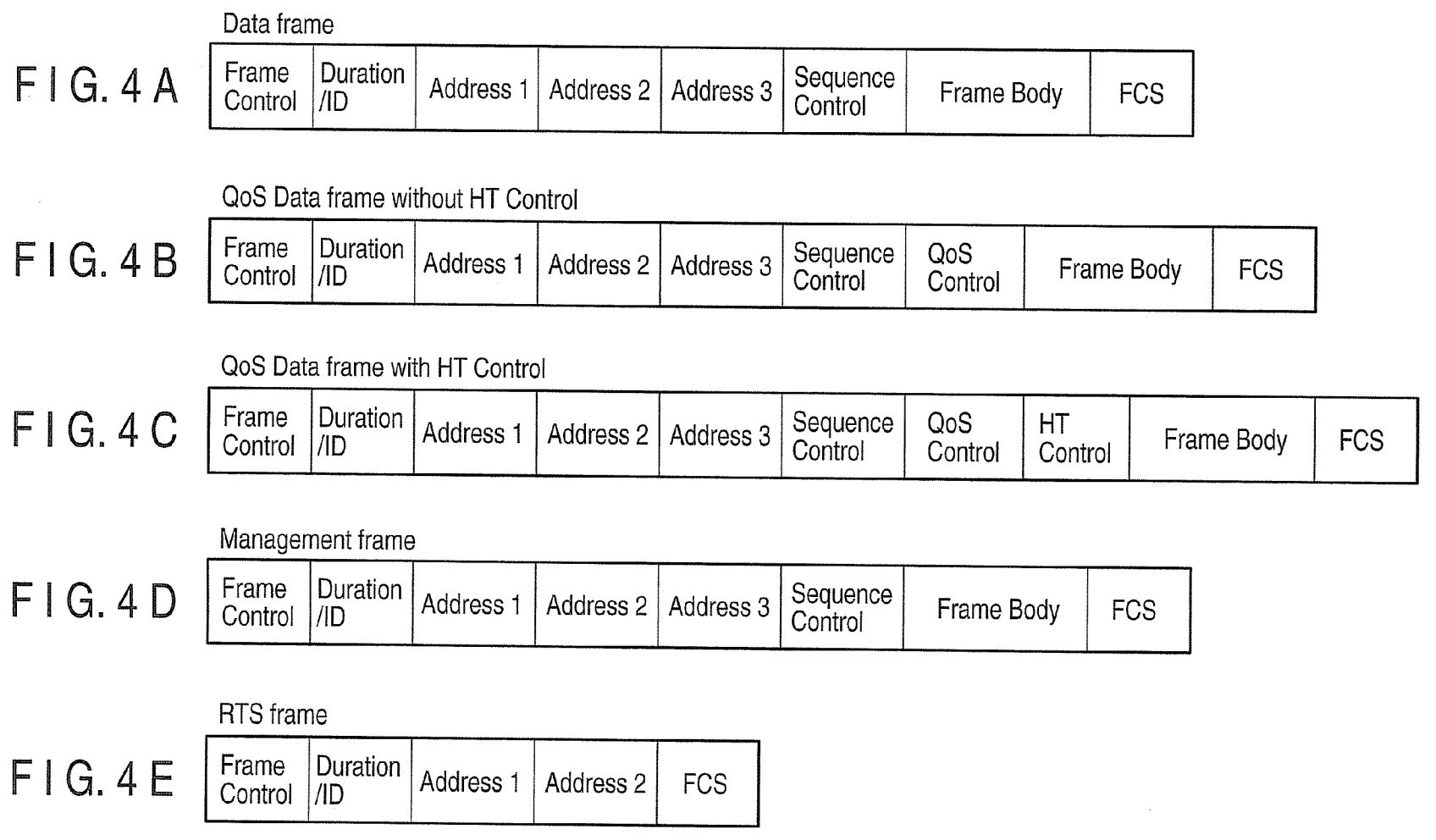

Data frame

| Frame Control | Duration /ID | Address 1 | Address 2 | Address 3 | Sequence Control | Frame Body | FCS |
|---|---|---|---|---|---|---|---|

FIG. 4B

QoS Data frame without HT Control

| Frame Control | Duration /ID | Address 1 | Address 2 | Address 3 | Sequence Control | QoS Control | Frame Body | FCS |
|---|---|---|---|---|---|---|---|---|

FIG. 4C

QoS Data frame with HT Control

| Frame Control | Duration /ID | Address 1 | Address 2 | Address 3 | Sequence Control | QoS Control | HT Control | Frame Body | FCS |
|---|---|---|---|---|---|---|---|---|---|

FIG. 4D

Management frame

| Frame Control | Duration /ID | Address 1 | Address 2 | Address 3 | Sequence Control | Frame Body | FCS |
|---|---|---|---|---|---|---|---|

FIG. 4E

RTS frame

| Frame Control | Duration /ID | Address 1 | Address 2 | FCS |
|---|---|---|---|---|

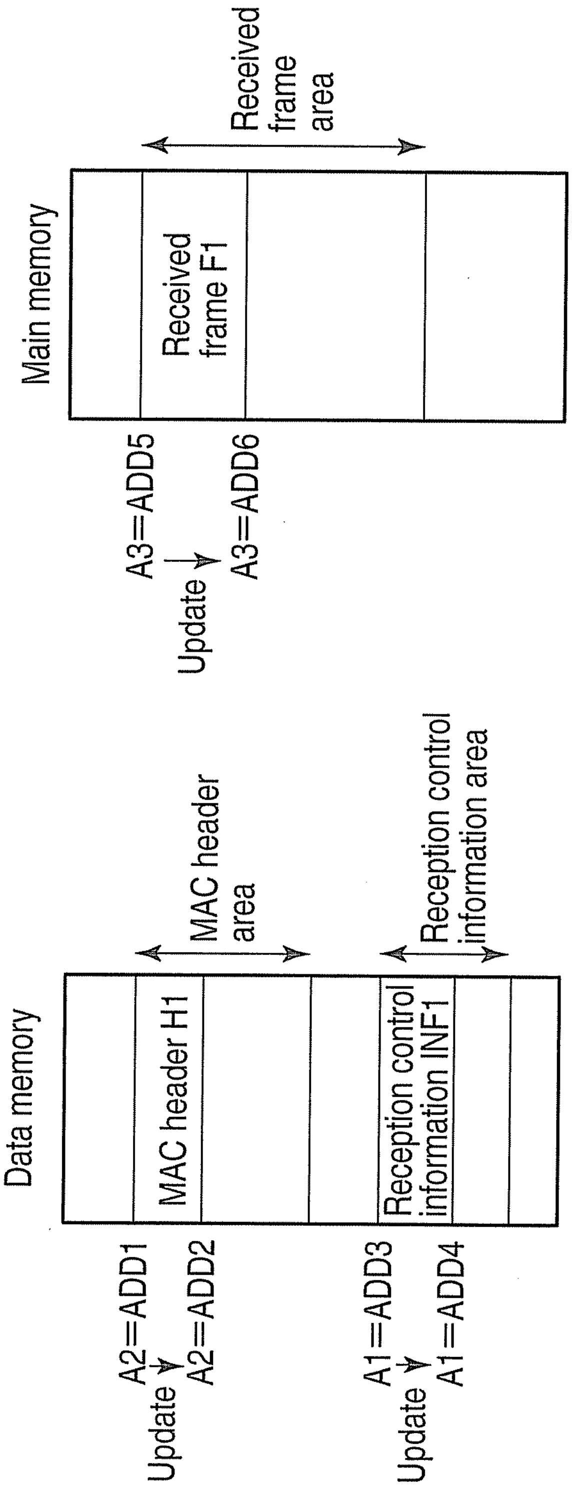
F I G. 8

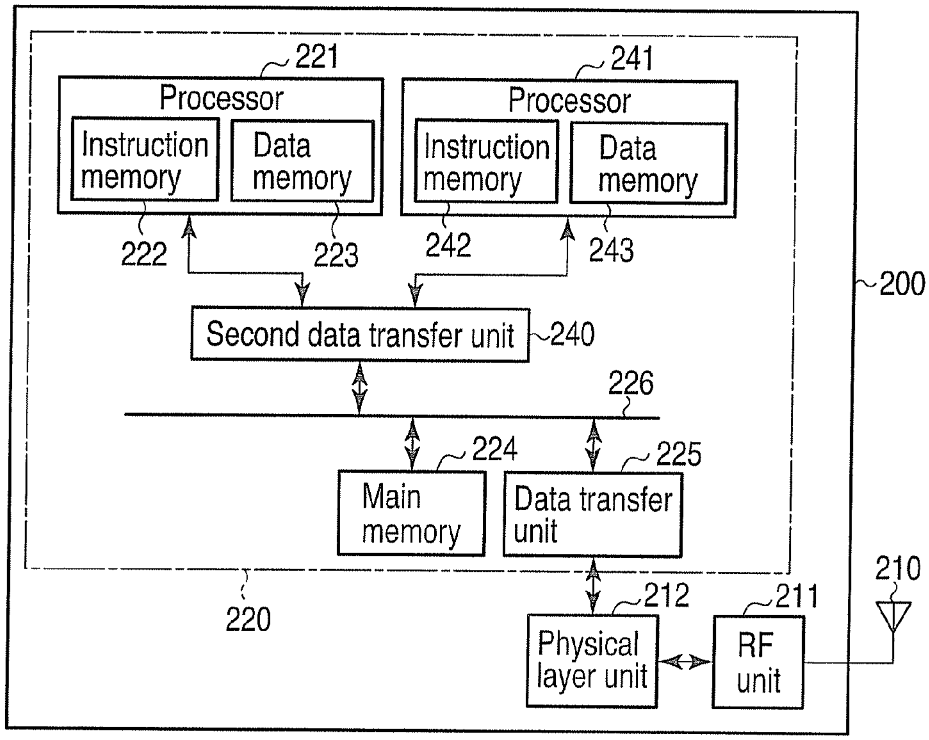
F I G. 1 0
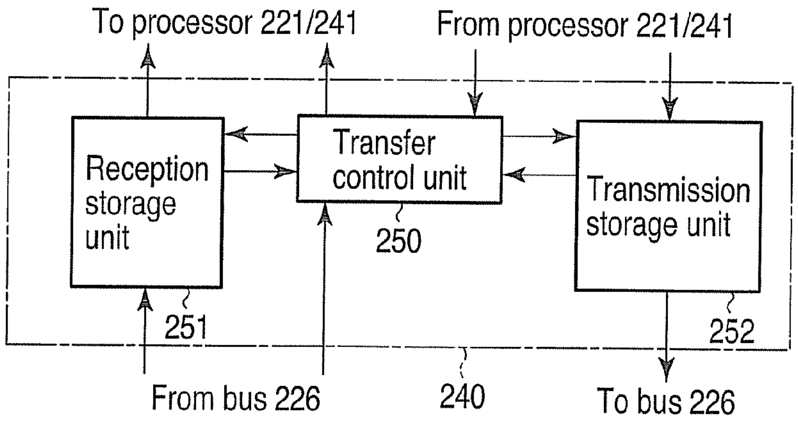
F I G. 1 1

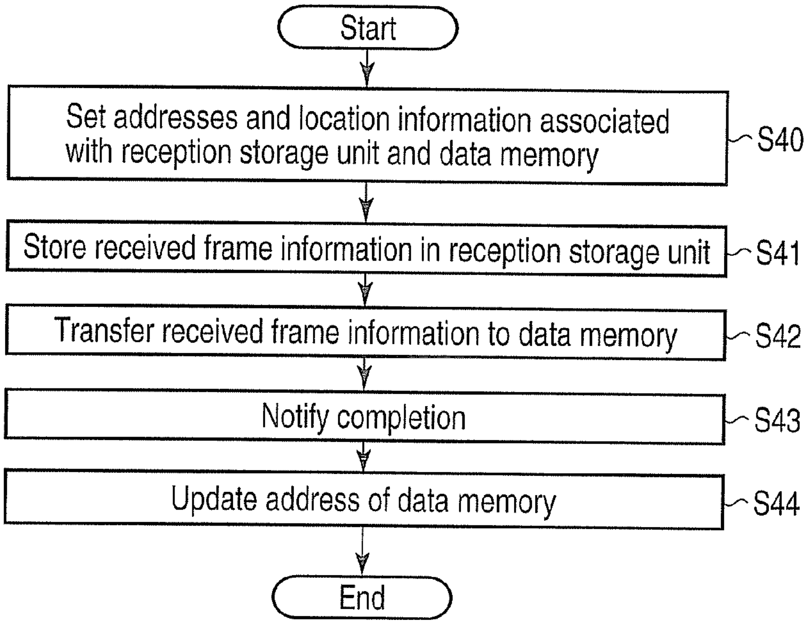
F I G. 1 2
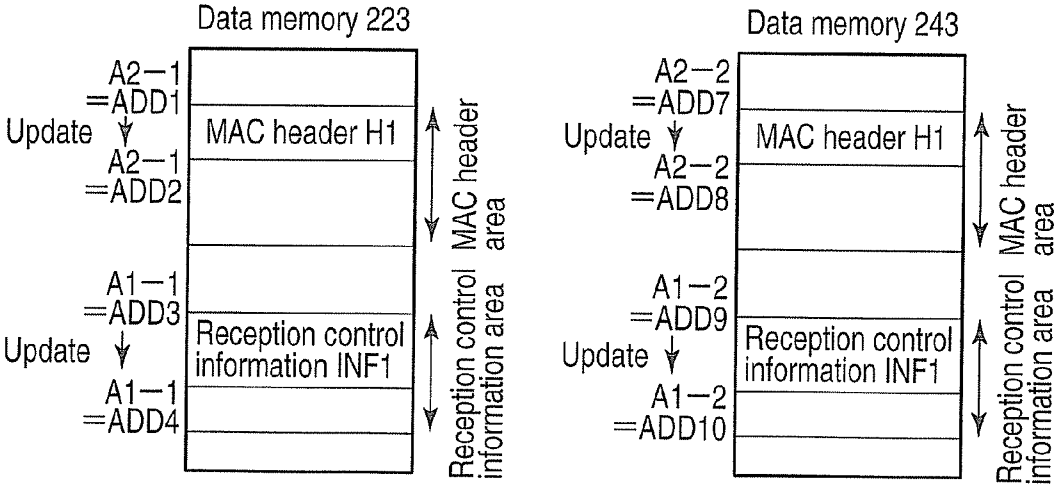
F I G. 1 3

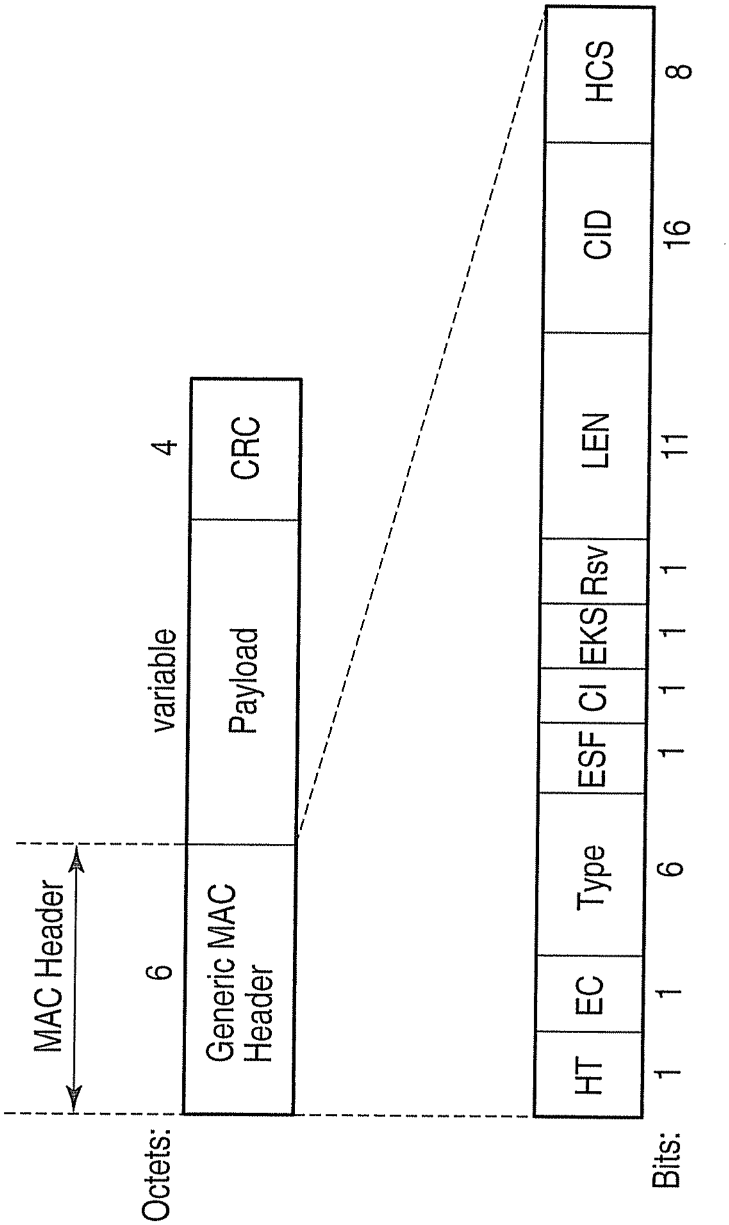
F I G. 1 5

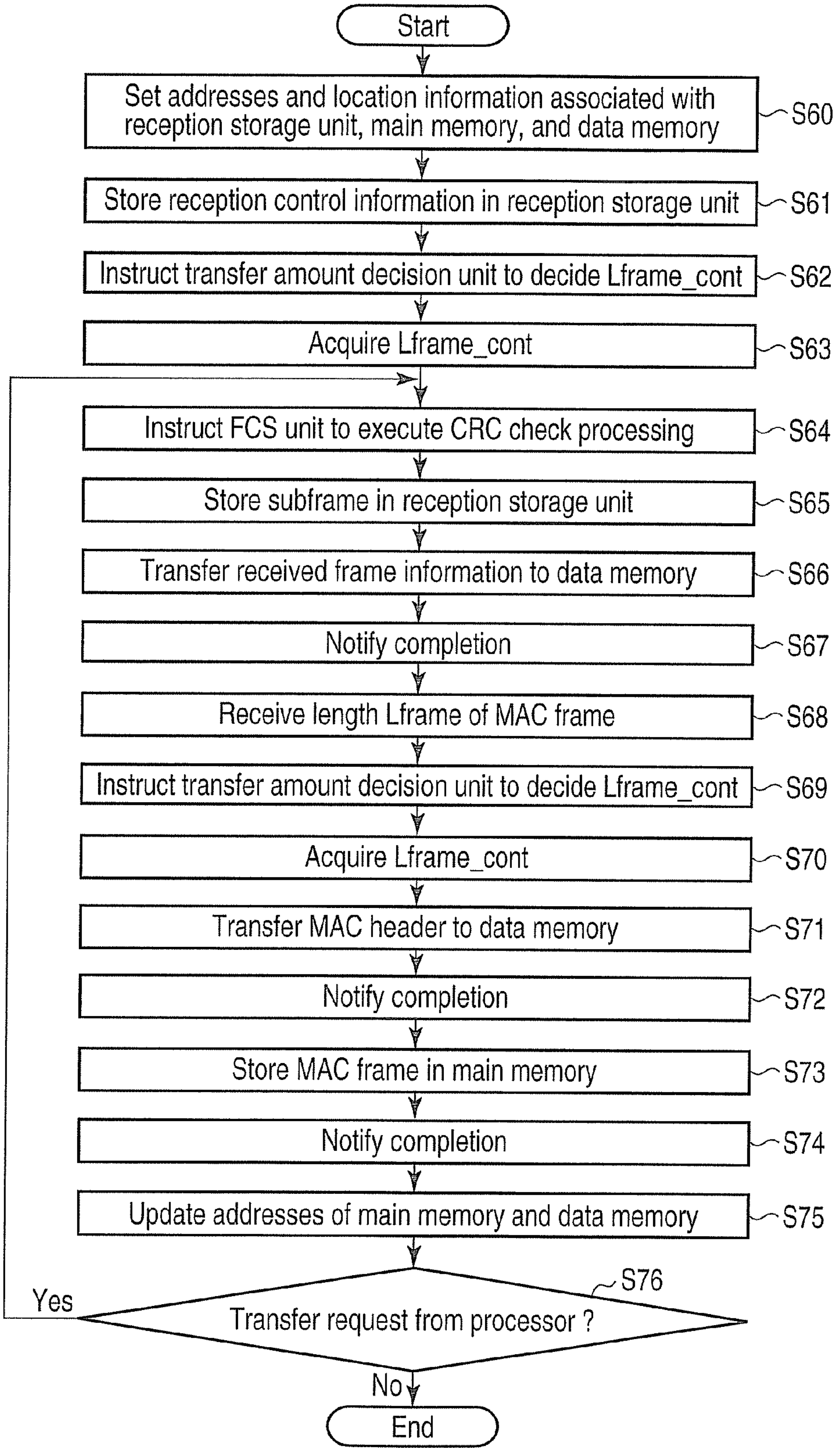
F I G. 1 9

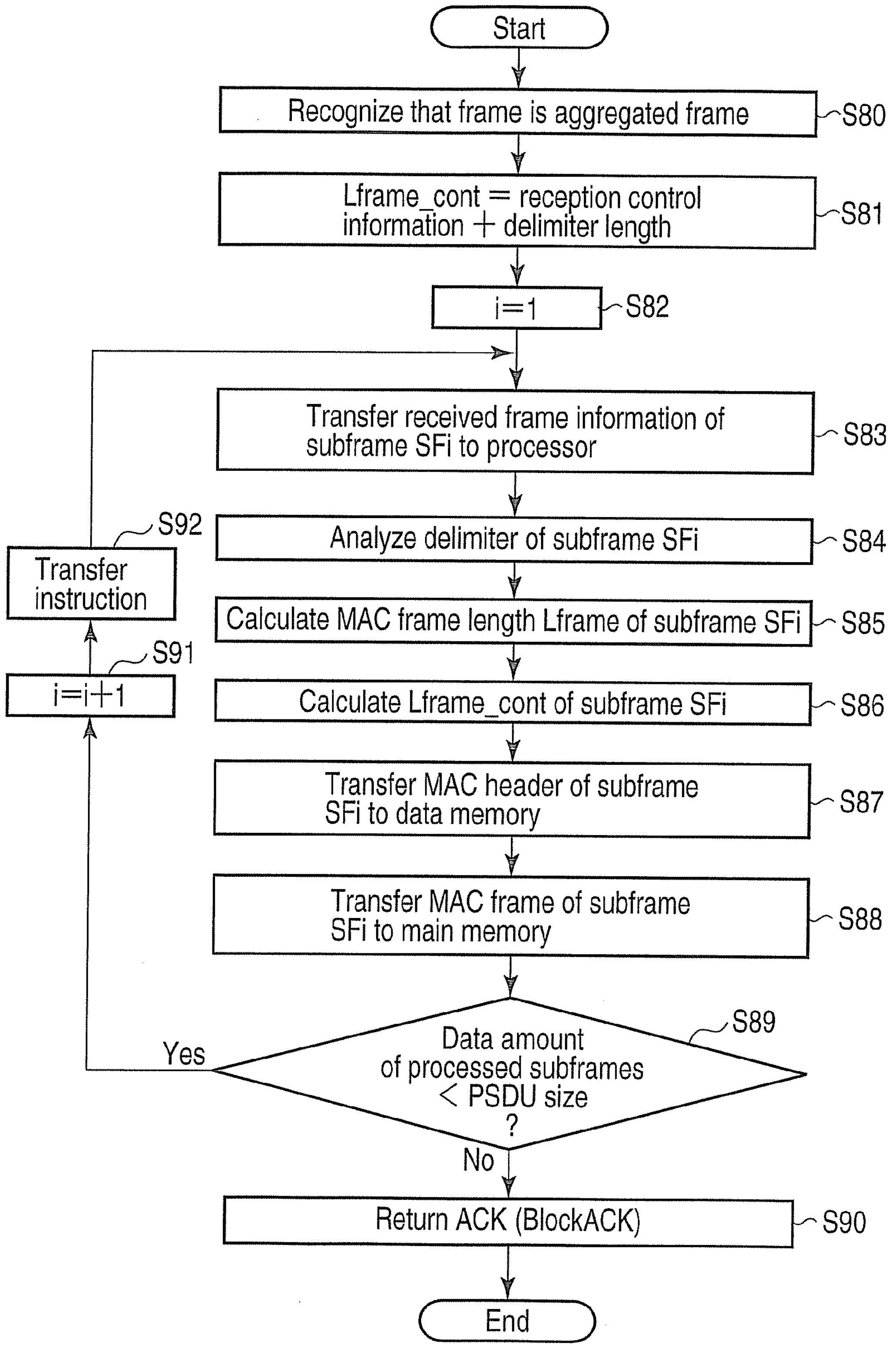
F I G. 2 0

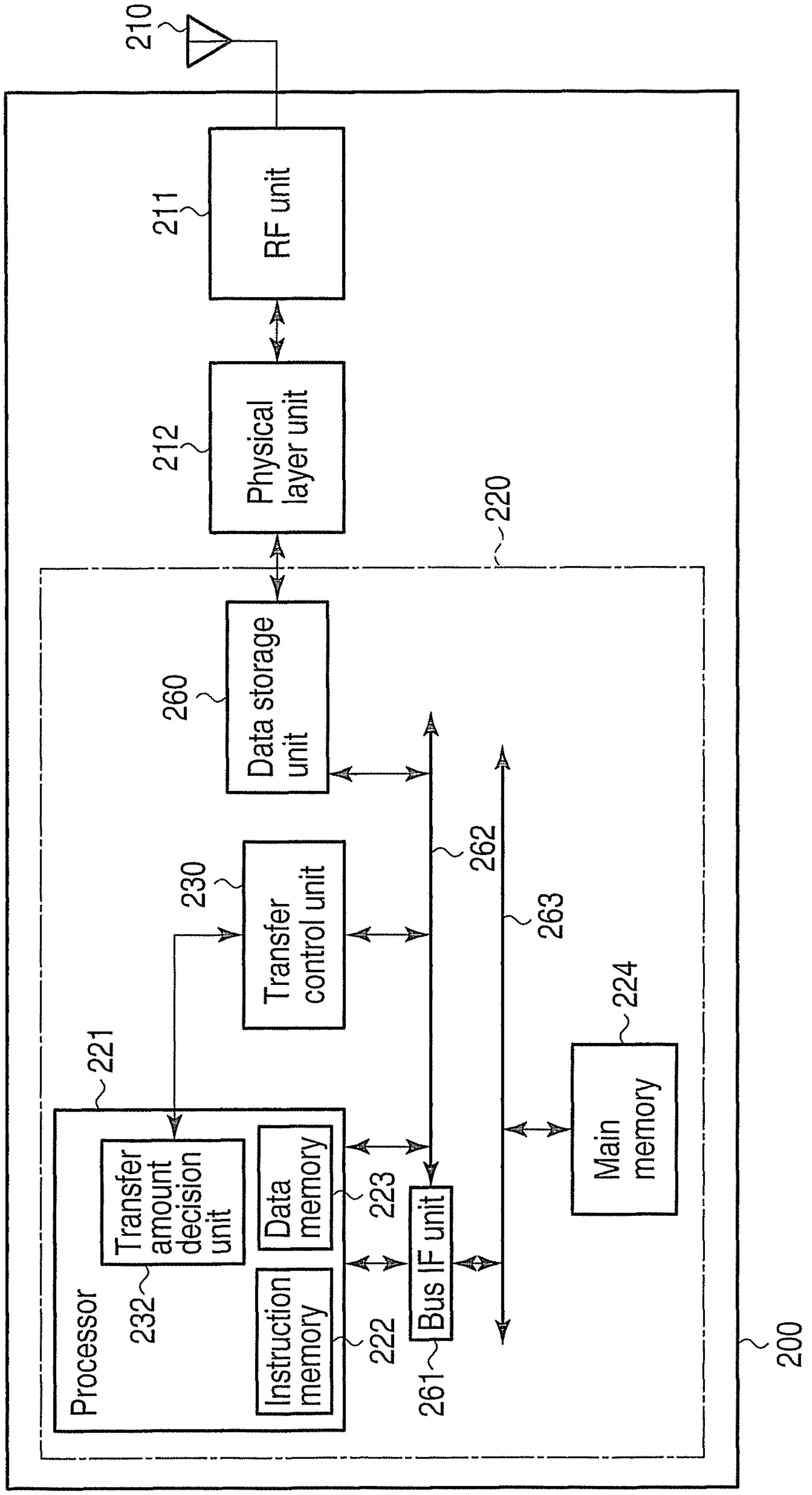
F I G. 2 2

WIRELESS COMMUNICATION APPARATUS AND WIRELESS COMMUNICATION METHOD

CROSS-REFERENCE TO RELATED APPLICATIONS

This application is based upon and claims the benefit of priority from Japanese Patent Application No. 2010-056382, filed Mar. 12, 2010; the entire contents of which are incorporated herein by reference.

FIELD

Embodiments described herein relate generally to a wireless communication apparatus and wireless communication method, for example, to a wireless communication apparatus which can support a plurality of wireless communication methods.

BACKGROUND

Conventionally, a wireless communication apparatus which supports a plurality of communication systems by software processing is known. Such wireless communication apparatus is disclosed in, for example, Jpn. Pat. Appln. KOKAI Publication Nos. 2003-283651 and 2009-031954.

However, with the conventional arrangement, a time required for a processor to access a memory is prolonged, and a long processing time is often required. As a result, it is difficult to sufficiently implement the functions of a MAC layer.

BRIEF DESCRIPTION OF THE DRAWINGS

FIG. 3 is a view showing a configuration example of a MAC frame;

FIG. 4A, FIG. 4B, FIG. 4C, FIG. 4D, and FIG. 4E are views showing the configurations of practical examples of the MAC frame;

FIG. 8 is a schematic view of memory spaces according to the first embodiment;

FIG. 10 is a block diagram of a wireless communication apparatus according to the second embodiment;

FIG. 11 is a block diagram of a second data transfer unit according to the second embodiment;

FIG. 12 is a flowchart showing the operation of a transfer control unit in the second data transfer unit according to the second embodiment;

FIG. 13 is a schematic view of memory spaces according to the second embodiment;

FIG. 15 is a view of a MAC frame according to the third embodiment;

FIG. 19 is a flowchart showing the operation of a transfer control unit according to the fourth embodiment;

FIG. 20 and FIG. 21 are flowcharts of a wireless communication method according to the fourth embodiment; and FIG. 22 is a block diagram of a wireless communication apparatus according to the fifth embodiment.

DETAILED DESCRIPTION

In general, according to one embodiment, a wireless communication apparatus includes: a reception unit; a storage unit; a transfer amount decision unit; and a first transfer control unit. The reception unit receives a first frame with a frame length of a first length using a first wireless method. The storage unit stores a part or whole of the first frame received by the reception unit. The transfer amount decision unit sets, when a second length decided based on the first wireless method is smaller than the first length, a third length to be the second length, and sets, when the second length is not less than the first length, the third length to be a value not more than the first length. The first transfer control unit transfers transfer information including first information of the third length included in the first frame to a first memory, and transfers the first frame by the first length to a second memory different from the first memory.

First Embodiment

Figure 1:
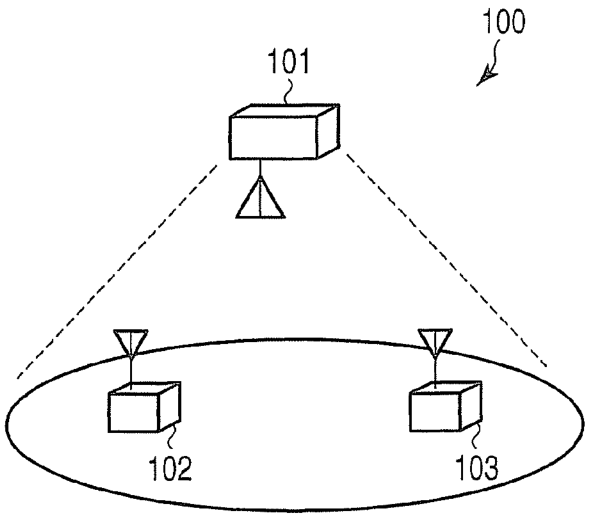
FIG. 1 is a block diagram of a wireless communication system according to the first embodiment.

A wireless communication apparatus and wireless communication system according to the first embodiment will be described below with reference to FIG. 1. FIG. 1 is a block diagram of a wireless communication system according to this embodiment, and exemplifies a wireless LAN system compliant with the IEEE802.11 standard.

As shown in FIG. 1, a wireless communication system (wireless LAN system) 100 includes a wireless communication base station (for example, a wireless LAN base station, so-called “access point”) 101 and a plurality of wireless communication terminals (for example, wireless LAN terminals) 102 and 103, and configures a communication network by these devices. The wireless LAN base station 101 accommodates the wireless LAN terminals 102 and 103 to form a BSS (Basic Service Set).

<Arrangements of Wireless LAN Base Station and Terminal>

Figure 2:
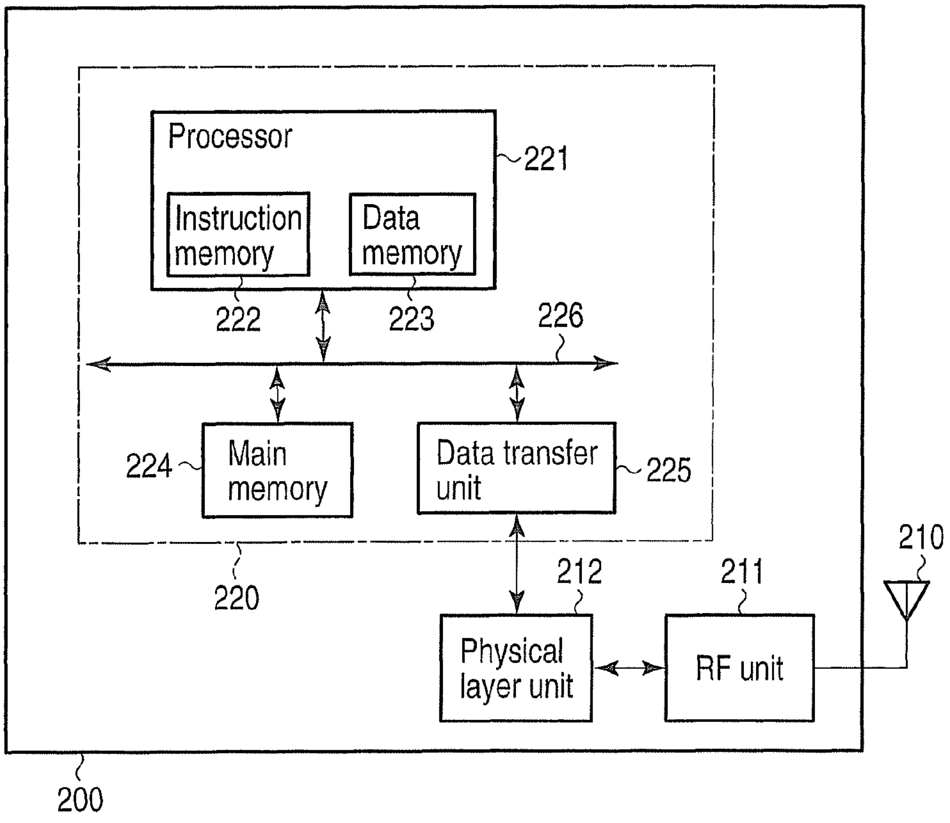
FIG. 2 is a block diagram of a wireless communication apparatus according to the first embodiment.

FIG. 2 is a block diagram of a wireless communication apparatus according to this embodiment. A wireless communication apparatus 200 having this arrangement is applied to the wireless LAN base station 101 and/or the wireless LAN terminals 102 and 103 shown in FIG. 1. A case will be exemplified below wherein the wireless communication apparatus 200 is applied to the wireless LAN terminal 102. The wireless communication apparatus 200 according to this embodiment can support a plurality of wireless communication methods, and is programmed to support, for example, the IEEE802.11 (including IEEE802.11a, IEEE802.11b, IEEE802.11g, and IEEE802.11n) standard.

As shown in FIG. 2, the wireless communication apparatus 200 roughly includes an antenna 210, RF (radio frequency) unit 211, physical layer unit 212, and MAC (Medium Access Control) layer unit 220.

The antenna 210 receives a wireless signal output in a frequency band according to a predetermined wireless communication method (for example, a 2.4-GHz or 5-GHz band), or transmits a wireless signal in a predetermined frequency band. That is, the wireless communication apparatus 200 receives a wireless signal from the wireless LAN base station 101 via the antenna 210, or transmits a wireless signal to the wireless LAN base station 101.

The RF unit 211 is connected to the antenna 210 and physical layer unit 212. The RF unit 211 includes a low noise amplifier (LNA), frequency converter (down converter), and variable-gain amplifier. The LNA amplifies a reception signal from the antenna 210. The down converter converts the frequency of the signal amplified by the LNA into an intermediate frequency or baseband frequency. The variable-gain amplifier executes automatic gain control (AGC). A wireless signal received by the antenna 210 is converted into a baseband signal by the RF unit 211, and that baseband signal is then output to the physical layer unit 212.

The physical layer unit 212 includes an analog-to-digital converter (ADC), and a reception processor which executes demodulation and decoding processes. In the physical layer unit 212, the baseband signal is converted into a digital signal by the ADC. After that, the reception processor executes reception processing including predetermined demodulation and decoding processes compliant with IEEE802.11 (including IEEE802.11a, IEEE802.11b, IEEE802.11g, and IEEE802.11n). In this way, the physical layer unit 212 converts the digital signal into a MAC frame specified by IEEE802.11, and transfers it to a data transfer unit 225.

On the other hand, at the time of transmission, the physical layer unit 212 transmits a MAC frame generated by the MAC layer unit 220. The MAC frame is, for example, a data frame or control frame, and the control frame includes ACK and CTS data. The physical layer unit 212 further includes a transmission processor and digital-to-analog converter (DAC). Then, the transmission processor executes transmission processing including predetermined modulation and encoding processes compliant with, for example, IEEE802.11 (including IEEE802.11a, IEEE802.11b, IEEE802.11g, and IEEE802.11n) in association with the MAC frame. The DAC converts a digital signal generated by this transmission processing into an analog baseband signal, and inputs it to the RF unit 211. In this case, the RF unit 211 up-converts the input baseband signal to a predetermined frequency band (for example, a 2.4-GHz or 5-GHz band), and outputs the converted signal as a wireless signal from the antenna 210. The physical layer unit 212 may be a circuit such as an FPGA (Field Programmable Gate Array) or reconfigurable processor, whose functions can be changed by changing programs, or a combination of logic circuits specialized to specific processing.

The MAC layer unit 220 includes a processor 221, a main memory 224, and the data transfer unit 225. These units are connected via a bus 226 to be able to communicate with each other. The data transfer unit 225 exchanges transmission/reception frames with the physical layer unit 212. The main memory 224 mainly stores transmission/reception frames. The processor 221 mainly executes protocols specified in a MAC layer. Furthermore, the processor 221 includes an instruction memory 222 and data memory 223. The instruction memory 222 stores instruction programs to be executed by the processor 221 (especially, an arithmetic unit which makes arithmetic operations in the processor 221). The data memory 223 stores data (when it is used as a work memory by the processor 221) and transmission/reception frames. The instruction memory 222 and data memory 223 are memories which allow faster accesses than those to the main memory 224 by the processor 221 when programs to be executed by the processor 221 and data are read out from or written in these memories. More specifically, the processor 221 is a CPU or DSP, and implements functions of the MAC layer. As a practical example, the functions of the MAC layer include, for example, generation of a transmission MAC frame (e.g., a data frame), generation of a response frame (e.g., an ACK frame), and adjustment of the transmission timing of a MAC frame.

<Configuration Example of MAC Frame>

The configuration of a MAC frame according to this embodiment will be described below. A general MAC frame format includes a MAC header, frame body, and FCS.

In the MAC header, information required for reception processing in the MAC layer is set. In the frame body, information (e.g., data from an upper layer) according to a frame type is set. In the FCS, a CRC (Cyclic Redundancy Code) used to determine whether or not the MAC header and frame body are normally received is set.

FIG. 3 is a view showing a configuration example of a MAC frame in the wireless LAN system compliant with the IEEE802.11 standard. As shown in FIG. 3, the MAC header includes a Frame Control field, Duration/ID field, Address fields (a plurality of fields are included: Address1 to Address4 in FIG. 3), Sequence Control field, QoS Control field, and HT Control field.

In the Frame Control field, values according to a frame type are set. In the Duration/ID field, a transmission standby period (NAV: Network Allocation Vector) is set. In the Address fields, a direct destination and final destination of the MAC frame and/or a source MAC address are/is set. In the Sequence Control field, a sequence number of data to be transmitted, and a fragment number at the time of fragmentation of data are set. The QoS Control field and HT Control field will be described later.

The Frame Control field includes a Protocol Version field, Type field, Subtype field, “To DS” field, “From DS” field, More Fragment field, Protected Frame field, and Order field.

The Protocol Version field indicates the version of the MAC protocol.

The Type field indicates the type of MAC frame. That is, based on a bit sequence set in the Type field, a frame type, i.e., one of a control frame, management frame, and data frame, to which the MAC frame belongs can be determined.

Furthermore, a bit sequence in the Subtype field indicates the type of MAC frame in each frame type.

In the “To DS” field, information indicating whether a receiving station is a wireless LAN base station or wireless LAN terminal is set. In the “From DS” field, information indicating whether a transmitting station is a wireless LAN base station or wireless LAN terminal is set. For example, in case of a frame to be transmitted from a wireless LAN base station to a wireless LAN terminal, “0” is set in the “To DS” field, and “1” is set in the “From DS” field. When “1” is set in both the “To DS” and “From DS” fields, this means a frame exchanged between wireless LAN base stations, and an Address4 field is appended to the MAC header. However, in other settings, an Address4 field is not appended.

The More Fragment field holds information indicating whether or not a subsequent fragment frame exists when data is fragmented.

In the Protected Frame field, information whether or not the frame is protected is set.

In the Order field, information indicating that the order of frames is inhibited from being replaced upon relaying frames or information indicating whether or not the HT Control field is appended is set.

For example, when it is identified based on the Type field of a normally received frame that the frame is a data frame, whether data included in the frame is QoS data or non-QoS data can be discriminated by further confirming a bit sequence set in the Subtype field.

In case of a QoS data frame, the QoS Control field is appended to the MAC header (conversely, in case of non-QoS data, no QoS Control field is appended). Therefore, when the QoS data is discriminated as a result of determination, the QoS Control field is checked. This QoS Control field includes a TID field in which an identifier according to the traffic of data is set (16 different identifiers ranging from 0 to 15 are available), and an Ack policy field in which a transmission acknowledgement method is set. By checking the TID field, a data traffic type can be recognized. By checking the Ack policy field, it can be discriminated whether that QoS data is transmitted in a Normal Ack policy, Block Ack policy, or No Ack policy. Note that when a bit sequence that means the Normal Ack policy is set in the Ack policy field, this means that transmission of an immediate response frame is requested upon reception of a QoS data frame. On the other hand, transmission of an immediate response frame is always requested upon reception of a non-QoS data (Subtype indicates "Data") frame. The Order field in case of non-QoS data indicates information which means that the order of frames is inhibited from being replaced.

The HT Control field can be used in communications between wireless communication apparatuses which support the IEEE802.11n standard. The HT Control field is appended only when a MAC frame transmitted in a physical layer frame format specified by only IEEE802.11n is QoS data or a management frame, and "1" is set in the Order field (whether or not the received physical layer frame is compliant with a physical layer frame format specified by only the IEEE802.11n standard can be determined based on transfer frame information from the physical layer unit 212). This HT Control field includes information required to assist, e.g., a Link Adaptation function specified by the IEEE802.11n standard.

In FIG. 3, numerals described above the respective fields of the MAC header indicate the lengths (sizes) of the respective fields in octet units. Note that one octet is equal to 8 bits. Also, numerals described above the respective fields in the Frame Control field indicate the lengths (sizes) of the respective fields in bit units. As shown in FIG. 3, the maximum length of the MAC header is, for example, 36 octets (36 bytes).

However, the length of the MAC header varies depending on the frame type. This point will be described below with reference to FIG. 4A, FIG. 4B, FIG. 4C, FIG. 4D, and FIG. 4E. FIG. 4A, FIG. 4B, FIG. 4C, FIG. 4D, and FIG. 4E are schematic views of respective frames. In FIG. 4A, a data frame is one of non-QoS data, and the length of a MAC header is 24 octets. In FIG. 4B, the length of a MAC header of a QoS data frame to which no HT Control field is appended is 26 octets. In FIG. 4C, the length of a MAC header of a QoS data frame to which an HT Control field is appended is 30 octets. In FIG. 4D, the length of a MAC header of a management frame is 24 octets. In FIG. 4E, an RTS (Request To Send) frame is one of control frames, and the length of a MAC header is 16 octets.

<Internal Arrangement of Data Transfer Unit 225>

Figure 5:
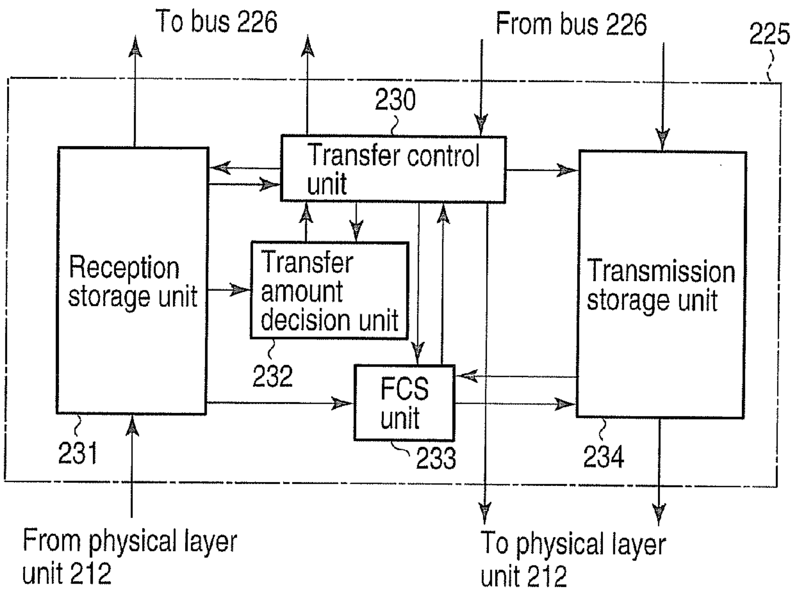
FIG. 5 is a block diagram of a data transfer unit according to the first embodiment.

The internal arrangement of the data transfer unit 225 shown in FIG. 2 will be described below with reference to FIG. 5. FIG. 5 is a block diagram of the data transfer unit 225. As shown in FIG. 5, the data transfer unit 225 includes a transfer control unit 230, reception storage unit 231, transfer amount decision unit 232, FCS unit 233, and transmission storage unit 234.

The reception storage unit 231 temporarily stores a MAC frame received from the physical layer unit 212. The transfer amount decision unit 232 decides the length (size) of received frame information to be transferred to the data memory 223. The FCS unit 233 checks whether or not a CRC in the received MAC frame is correct. The transmission storage unit 234 temporarily stores a transmission MAC frame transferred from the bus 226. The transfer control unit 230 controls the reception storage unit 231, transfer amount decision unit 232, FCS unit 233, and transmission storage unit 234.

The reception storage unit 231 and transmission storage unit 234 include, for example, a Static Random Access Memory (SRAM) and flip-flop. The memory capacity of each of these storage units may be either a capacity which can store a full MAC frame to be transmitted or received, or that which can store a part of a MAC frame. The reception storage unit 231 and transmission storage unit 234 can also store information such as a transfer rate for reception or transmission, and a MAC frame length.

The received frame information to be transferred to the data memory 223 includes at least a MAC header of the received MAC frame, and may also include information such as physical layer parameters including a transfer rate and modulation method at the time of reception, and a MAC frame length (these pieces of information will be referred to as reception control information), as needed.

<Operation of Transfer Amount Decision Unit 232>

Figure 6:
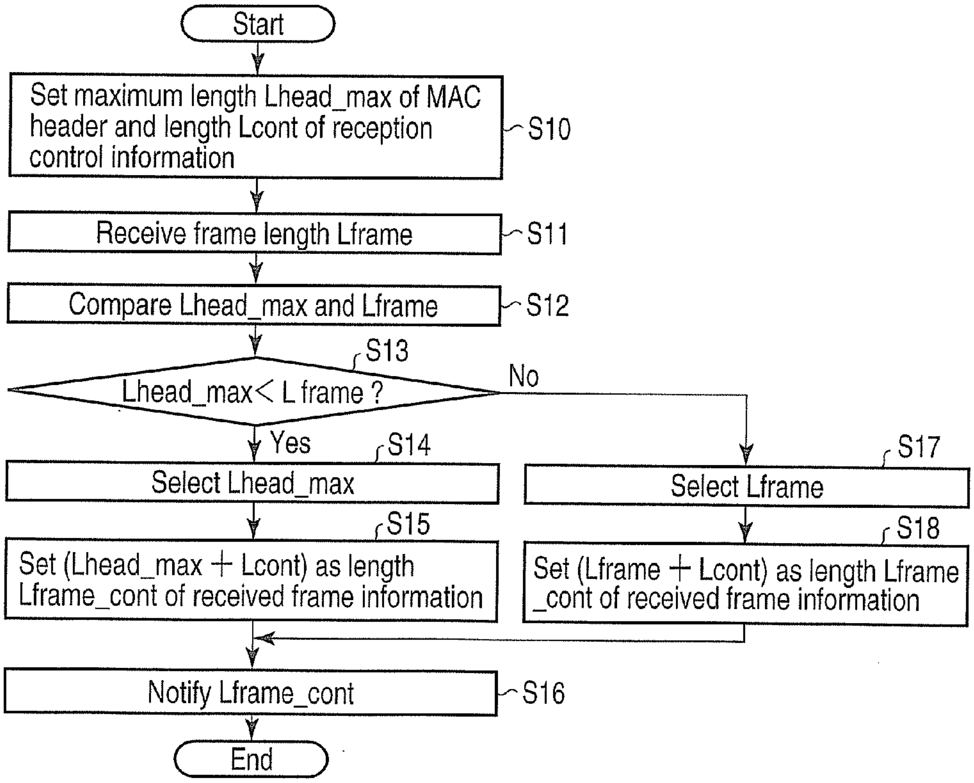
FIG. 6 is a flowchart showing the operation of a transfer amount decision unit according to the first embodiment.

The operation of the transfer amount decision unit 232 will be described below with reference to FIG. 6. FIG. 6 is a flowchart showing the operation of the transfer amount decision unit 232. The transfer amount decision unit 232 decides the length of received frame information to be transferred from the reception storage unit 231 to the data memory 223. As described above, the received frame information includes a combination of a MAC header and reception control information.

For this purpose, in the transfer amount decision unit 232, a maximum length Lhead_max of a MAC header of a MAC frame used in the wireless communication method, and a length Lcont of reception control information are set in advance (step S10). For example, the maximum length Lhead_max of a MAC header used in the IEEE802.11n standard is 36 bytes, as described above using FIG. 3. Therefore, "36" is set in advance in the transfer amount decision unit 232 as an initial value of the maximum length Lhead_max of a MAC header. On the other hand, assume that the length Lcont of the reception control information is, for example, 4 bytes.

In this case, assume that the received frame is, for example, a QoS data frame with an HT Control field shown in FIG. 4C, and the length of a frame body is 100 bytes. The length of this frame is 134 bytes. The physical layer unit 212 notifies the data transfer unit 225 of a value Lframe of this frame length (step S11). The transfer amount decision unit 232 compares the received frame length (Lframe=134 bytes) notified from the physical layer unit 212 and the maximum length (Lhead_max=36 bytes) of a MAC header, which is set in advance (step S12).

In this example, since the maximum length Lhead_max of a MAC header is smaller than the received frame length Lframe (Lhead_max<Lframe: YES in step S13), the transfer amount decision unit 232 decides the value (Lhead_max=36 bytes) of the maximum length of a MAC header as the length of a MAC header to be transferred (step S14). Then, the transfer amount decision unit 232 adds the length (Lcont=4 bytes) of the reception control information to the decided length to obtain a length Lframe_cont=40 bytes of the received frame information (step S15), and notifies the transfer control unit 230 of that length (step S16).

On the other hand, if the received frame is an RTS frame shown in FIG. 4E, its frame length is 20 bytes. In this case, as a result of comparison between the received frame length (Lframe=20 bytes) notified from the physical layer unit 212 and the maximum length (Lhead_max=36 bytes) of a MAC header, which is set in advance, the maximum length Lhead_max of a MAC header is equal to or larger than the received frame length Lframe (Lhead_max≧Lframe: NO in step S13).

Hence, the transfer amount decision unit 232 decides the value (Lframe=20 bytes) of the received frame length as the length of a MAC header to be transferred (step S17). Then, the transfer amount decision unit 232 adds the length (Lcont=4 bytes) of the reception control information to that decided length to obtain the length Lframe_cont=24 bytes of the received frame information (step S18), and notifies the transfer control unit 230 of that length (step S16).

Note that when, e.g., an FCS field is appended to a MAC frame, a decided value (Lframe) of the length of the MAC header need not always be the same as the value Lframe of the received frame length, and it may be smaller than the value Lframe of the received frame length. Therefore, upon reception of an RTS frame in this example, the transfer amount decision unit 232 may decide a value (16 bytes) obtained by excluding the length of the FCS field (4 bytes) as the length of a MAC header to be transferred.

<Operation of Transfer Control Unit 230>

The operation of the transfer control unit 230 will be described below. At the time of reception of a MAC frame, the transfer control unit 230 controls to transfer the received frame, which is stored in the reception storage unit 231 by the physical layer unit 212, to the main memory 224, and to transfer received frame information including a MAC header, reception transfer rate, and MAC frame length to the data memory 223. On the other hand, at the time of transmission of a MAC frame, the transfer control unit 230 controls to transfer the MAC frame, which is prepared by the processor 221 in the data memory 223 or main memory 224, and transmission control information including a transmission transfer rate and MAC frame length from that memory 223 or 224 to the transmission storage unit 234. The physical layer unit 212 reads out the MAC frame and transmission control information stored in the transmission storage unit 234.

In the transfer control unit 230, some parameters are set in advance for transfer control of the received frame information and the received frame. These parameters are, for example, as follows.

- A transfer destination memory address A1 for transferring reception control information to the data memory 223. This address is that in the data memory 223.
- Location information of a storage area of the reception control information in the reception storage unit 231. For example, the reception storage unit 231 includes a plurality of FIFOs, and this information indicates a FIFO that stores the reception control information of these FIFOs (e.g., FIFO1).
- A transfer destination memory address A2 for transferring a MAC header to the data memory 223. This address is that in the data memory 223.
- Location information of a storage area of the MAC header in the reception storage unit 231. For example, the reception storage unit 231 includes a plurality of FIFOs, and this information indicates a FIFO that stores the MAC header of these FIFOs (e.g., FIFO2).
- A transfer destination memory address A3 for transferring a received frame to the main memory 224. This address is that in the main memory 224.
- Location information of a storage area of the received frame in the reception storage unit 231. For example, when the reception storage unit 231 includes a plurality of FIFOs, this information indicates a FIFO that stores the received frame of these FIFOs (e.g., FIFO3).

Figure 7:
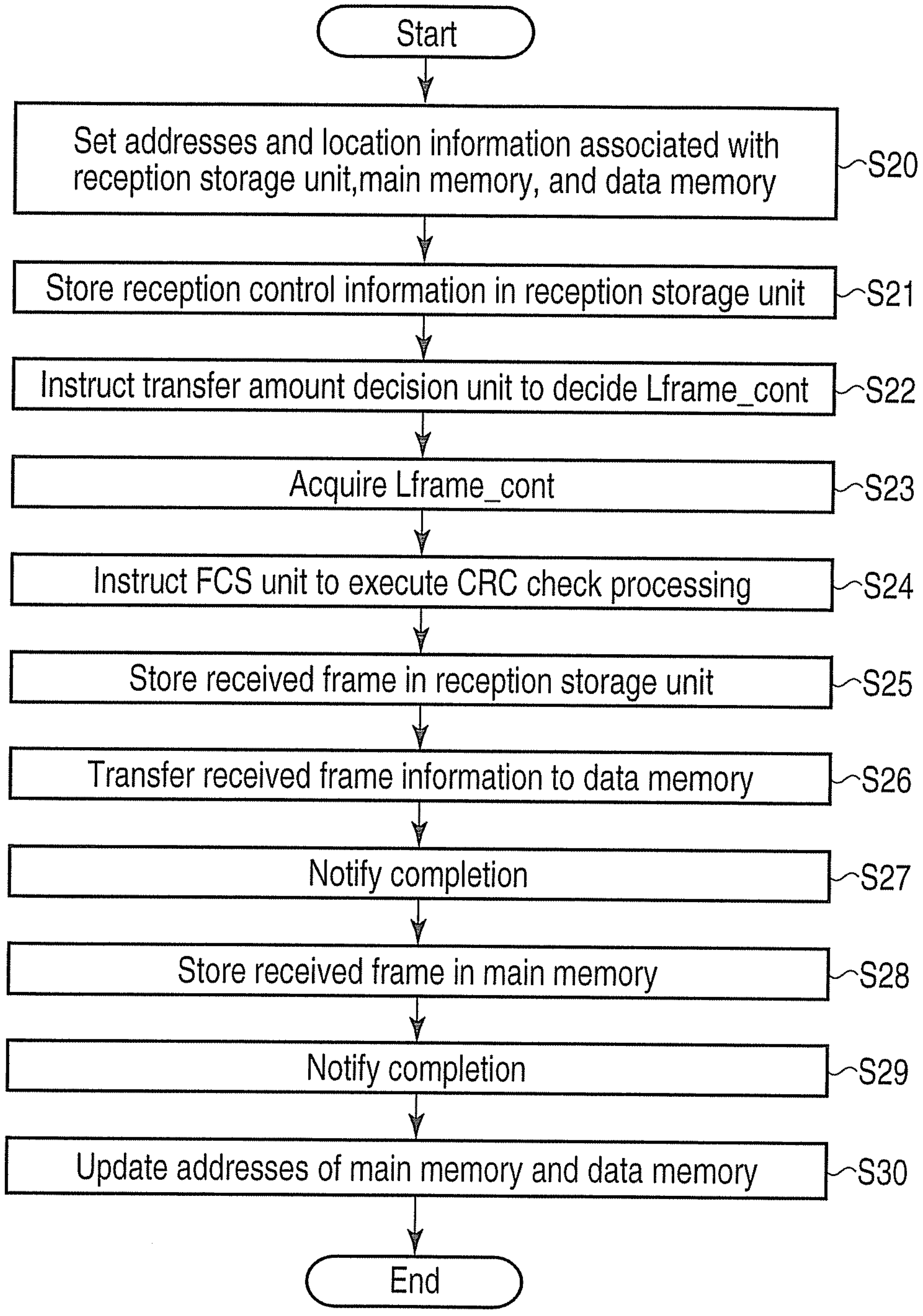
FIG. 7 is a flowchart showing the operation of a transfer control unit according to the first embodiment.

FIG. 7 is a flowchart showing the operation of the transfer control unit 230, and especially shows a case in which a frame is received from the physical layer unit 212. As shown in FIG. 7, in the transfer control unit 230, the transfer destination addresses A1 to A3 are set, and pieces of location information in the reception storage unit 231 (for example, FIFO1 to FIFO3) are set (step S20).

After that, the transfer control unit 230 stores reception control information transferred from the physical layer unit 212 in the area set in step S20 in the reception storage unit 231 (step S21). In the above example, the reception control information is stored in FIFO1.

The transfer control unit 230 then instructs the transfer amount decision unit 232 to decide the length Lframe_cont of received frame information (step S22), and acquires this value Lframe_cont (step S23).

Next, the transfer control unit 230 instructs the FCS unit 233 to execute CRC check processing (step S24), and then stores the received frame transferred from the physical layer unit 212 in the reception storage unit 231 (step S25). The area that stores the received frame is that set in step S20. In the above example, the MAC header is stored in FIFO2, and the received frame is stored in FIFO3.

After that, the transfer control unit 230 transfers the received frame information to the areas starting from the addresses A1 and A2 of the data memory 223 (step S26). Upon completion of transfer, the transfer control unit 230 issues a completion notification to the processor 221 (step S27). In this case, the size of the received frame information is that acquired in step S23.

Furthermore, the transfer control unit 230 transfers the received frame to the area starting from the address A3 of the main memory 224 (step S28). Upon completion of transfer, the transfer control unit 230 issues a completion notification to the processor 221 (step S29). Then, the transfer control unit 230 updates the addresses A1 to A3 (step S30). At the time of next data transfer, the addresses A1 to A3 updated in step S30 are used.

As described above, the received frame and received frame information are transferred to the processor 221. The data memory 223 and main memory 224 at the time of data transfer will be described below with reference to FIG. 8. FIG. 8 shows the memory spaces of the data memory 223 and main memory 224 to which the received frame information and received frame are transferred by the transfer control unit 230. Assume that the value of the transfer destination memory address A1 is “address ADD3”, that of the transfer destination memory address A2 is “address ADD1”, and that of the transfer destination memory address A3 is “address ADD5”. Therefore, in the data memory 223, reception control information INF1 and a MAC header H1 are stored in areas respectively starting from the addresses ADD3 and ADD1. In the main memory 224, a received frame F1 is stored in an area starting from the address ADD5. Since the transfer control unit 230 recognizes the sizes of the reception control information INF1, MAC header H1, and received frame F1, it can detect next areas required to store these pieces of information.

Thus, the transfer destination memory address A1 is updated to "address ADD4", the transfer destination memory address A2 is updated to "address ADD2", and the transfer destination memory address A3 is updated to "address ADD6".

<Operation of Wireless Communication Apparatus 200>

Figure 9:
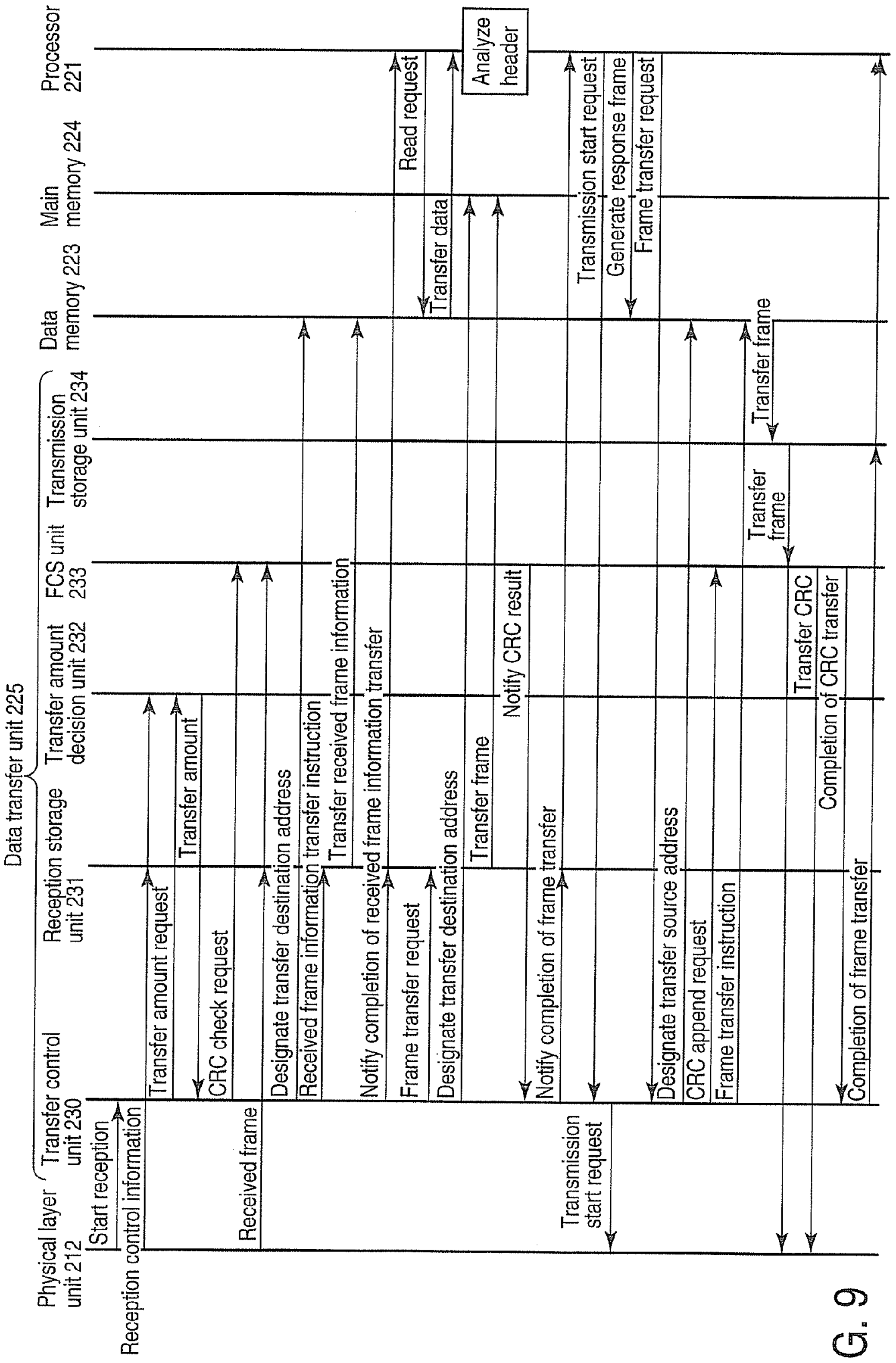
FIG. 9 is a flowchart of a wireless communication method according to the first embodiment.

The operation of the wireless communication apparatus 200 with the above arrangement will be described below while taking as an example the operation of the wireless LAN terminal 102 executed when it receives a data frame from the wireless LAN base station 101, and returns an ACK frame to the wireless LAN base station 101. FIG. 9 is a flowchart showing the operation of the wireless communication apparatus 200 as the wireless LAN terminal 102.

As shown in FIG. 9, the physical layer unit 212 issues a reception start signal before it stores a received MAC frame in the reception storage unit 231. With this signal, the physical layer unit 212 notifies the transfer control unit 230 of start of transfer of a received frame from itself. The physical layer unit 212 transfers reception control information including a reception transfer rate and received MAC frame length to the reception storage unit 231 during an interval after issuance of the reception start signal until it actually starts transfer of the received frame. Of this reception control information, information of at least the MAC frame length is also supplied to the transfer amount decision unit 232.

Next, the transfer control unit 230 requests the transfer amount decision unit 232 to decide a transfer amount (Lframe_cont) of received frame information to be transferred. The transfer control unit 230 acquires the transfer amount (Lframe_cont) of the received frame information and the MAC frame length (Lframe) from the transfer amount decision unit 232. Then, the transfer control unit 230 recognizes the length (for example, Lframe_cont=40 bytes) of the received frame information to be transferred to the memory area of the data memory 223, and the length (for example, Lframe=134 bytes) of the received frame to be transferred to the memory area of the main memory 224.

The transfer control unit 230 requests the FCS unit 233 to execute CRC check processing of the received frame to be stored in the reception storage unit 231. After that, the physical layer unit 212 begins to store the received frame in the reception storage unit 231 after elapse of a predetermined fixed time (e.g., 1 μs) since the reception start signal. The received frame is also transferred to the FCS unit 233.

Next, the transfer control unit 230 designates areas used to store the received frame information in the data memory 223. As for the reception control information of the received frame information, an area starting from the address A1 (the address ADD3 in the example of FIG. 8) of the data memory 223 is designated. Also, as for the MAC header, an area starting from the address A2 (the address ADD1 in the example of FIG. 8) is designated. After that, the transfer control unit 230 instructs the reception storage unit 231 to transfer the received frame information.

In response to this instruction, the reception storage unit 231 transfers the reception control information having the length of 4 bytes from a predetermined area (e.g., FIFO1) in itself to the area starting from the address A1 of the data memory 223. Also, the reception storage unit 231 transfers the MAC header having the length of 36 bytes from a predetermined area (e.g., FIFO2) in itself to the area starting from the address A2 of the data memory 223. Upon completion of transfer of the received frame information, the transfer control unit 230 notifies the processor 221 of completion of transfer of the received frame information.

Subsequently, the transfer control unit 230 designates an area used to store the received frame in the main memory 224. This area is that starting from the address A3 (the address ADD5 in the example of FIG. 8) of the main memory 224. After that, the transfer control unit 230 instructs the reception storage unit 231 to transfer the received frame.

In response to this instruction, the reception storage unit 231 transfers the received frame having the length of 134 bytes from a predetermined area (e.g., FIFO3) in itself to the area starting from the address A3 of the main memory 224. Upon completion of transfer of the received frame, the transfer control unit 230 notifies the processor 221 of completion of frame transfer together with the CRC check result (information indicating if a CRC is OK or NG) from the FCS unit 233.

On the other hand, after reception of the transfer completion notification of the received frame information from the transfer control unit 230, the processor 221 reads out the MAC header from the data memory 223. More specifically, the arithmetic unit of the processor 221 issues a read request to the data memory 223. In response to this request, the MAC header is transferred from the data memory 223 to the arithmetic unit of the processor 221. The processor 221 then analyzes the contents of the readout MAC header. The processing contents at that time are, for example, to specify the type of received frame by confirming the Type and Subtype fields in the MAC header, and to recognize whether or not the destination address is appropriate (the frame is addressed to the apparatus 200 or not) by confirming the address fields in the MAC header. As a result of this analysis, the processor 221 detects that the received frame is appropriately addressed (that the received frame is addressed to the apparatus 200). Furthermore, when the CRC check result from the FCS unit 233 is OK, the processor 221 judges that it is required to return an ACK frame (response frame). Then, the processor 221 notifies the transfer control unit 230 of a transmission start request. Upon reception of this notification, the transfer control unit 230 notifies the physical layer unit 212 of the transmission start request.

In this case, since the physical layer unit 212, which received the transmission start request, has to transmit a PHY header of, e.g., Preamble data before transmission of a MAC frame, there is a time lag from the transmission start request issuance timing until the physical layer unit 212 actually begins to process a transmission MAC frame.

Therefore, the processor 221 generates an ACK frame, and stores it in the data memory 223 during an interval (for example, 8 μs) after issuance of the transmission start request until the physical layer unit 212 actually requests a transmission frame. The ACK frame may be stored in the main memory 224. However, it is preferable to store the ACK frame in the data memory 223 having a higher write speed from the processor 221.

After the ACK frame is generated, in order to transfer the ACK frame to the physical layer unit 212, the processor 221 notifies the transfer control unit 230 of the storage address of the ACK frame in the data memory 223 and the frame length (10 bytes) of the ACK frame together with a frame transfer request.

In response to this notification, the transfer control unit 230 designates the address and data amount of the data memory 223 according to the notified address, and requests the FCS unit 233 to append a CRC to the end of the ACK frame.

Then, the transfer control unit 230 issues a frame transfer instruction to the data memory 223, and the transmission frame is transferred from the data memory 223 to the transmission storage unit 234. In this case, in order to append a CRC to the transmission frame, the ACK frame is transferred from the transmission storage unit 234 to the physical layer unit 212 via the FCS unit 233. Then, the FCS unit 233 transfers a CRC to the physical layer unit 212 after transfer of the ACK frame. After completion of transfer of the CRC, the FCS unit 233 notifies the transfer control unit 230 of it.

After that, the transfer control unit 230 notifies the processor 221 of completion of transfer of the transmission frame.

<Effect in this Embodiment>

As described above, with the arrangement according to the first embodiment, the processing speed can be improved by reducing an access time to the memory by the processor, thus supporting a plurality of wireless communication methods. This effect will be described below.

In recent years, electronic devices such as notebook personal computers, game console, car navigation systems, digital cameras, and personal digital assistant (PDA) having a wireless communication function have prevailed. As a communication method of the wireless communication function of this type, wireless LAN (Local Area Network) standards such as IEEE802.11a/11b/11g/11n, and the IEEE802.16/16e standards are known.

These electronic devices are installed with a plurality of communication methods, or a communication method is selected according to the use application of each individual electronic device. The standard of each wireless communication system has been frequently updated (for example, from IEEE802.11g to IEEE802.11n) for the purpose of upgrading such as speeding-up of a communication speed, and it is expected that such situation will continue in the future. Upon development of a wireless communication apparatus under such situation, it is required to support a plurality of communication methods, and a design change upon changing the standard is required.

In a conventional wireless communication apparatus, a circuit which processes transmission/reception data according to protocols of the communication standards and a signal processing circuit which performs modulation/demodulation are mainly designed using logic circuits, since their specifications associated with a time restriction are strict. However, the design using logic circuits is time-consuming in development itself, and a change in design specification due to change in communication standard causes an increase in development cost.

On the other hand, an arithmetic processing device such as a CPU (Central Processing Unit) or DSP (Digital Signal Processor) can support a variety of processes by changing software, and can flexibly support a change in wireless communication method and a change in standard.

As a wireless communication apparatus which can support a plurality of communication systems using such arithmetic processing device, for example, an arrangement in which a processor, instruction memory, data memory, and signal processing circuit are connected via a bus is known (Jpn. Pat. Appln. KOKAI Publication No. 2003-283651 described in BACKGROUND).

In general, functions installed in a wireless communication apparatus are implemented by a MAC (Medium Access Control) layer protocol which specifies, e.g., a control method required to determine an output timing of a signal to a medium (indicating a space in a wireless communication) of a network, and a physical layer protocol which specifies a data communication speed and a modulation method. The functions specified by the physical layer are normally implemented by a circuit such as an FPGA or reconfigurable processor, which can change functions by changing programs, due to a strict time restriction and a large processing volume. On the other hand, the functions specified by the MAC layer are normally implemented using a general-purpose processor due to a smaller numerical operation volume and more branch processes than the physical layer.

Note that the MAC layer of the IEEE802.11 standard has the following rule. For example, when a data frame addressed to a apparatus is normally received at the apparatus, an ACK frame is returned within a prescribed time (within SIFS: SIFS is, for example, 16 μs) as a response to that frame. In the communication standard in which some specifications with a strict time restriction are specified even in the MAC layer, processing in which the general-purpose processor reads out and analyzes a data frame written in the data memory and stores an ACK frame in the data memory requires much time. When two or more processors have to be connected to the bus so as to expand the functions of the MAC layer, since the number of processors connected to the bus increases, a waiting time when one processor accesses the data memory may be prolonged.

As a method for avoiding such problem, a method of increasing the clock frequencies of the processors and bus to increase data read/write speeds is available. However, since an increase in clock frequency leads to an increase in operation consumption power of the processors and bus, it is preferable to reduce the clock frequency as much as possible.

As another method, a method of transferring data to a predetermined memory area while reducing the load on a CPU is available (Jpn. Pat. Appln. KOKAI Publication No. 2009-031954 described in BACKGROUND). However, this method is not suited to implementation of the MAC functions since it does not consider the MAC protocol, and inefficient data transfer occurs.

As described above, in the conventional arrangement, due to an access time to the memory by the processor as an overhead, it becomes difficult to implement the functions of the MAC layer.

However, with the arrangement according to this embodiment, the wireless communication apparatus 200, which analyzes the received MAC frame by the processor 221, includes the data transfer unit 225. Using this data transfer unit 225, the received frame transferred from the physical layer unit 212 can be transferred to the data memory 223 without using the processor 221. Hence, an occupation time of the bus 226 by transfer of the received frame can be shortened.

Also, by transferring the MAC header to the data memory 223 which can be accessed at high speed from the processor 221, a time required for the processor 221 to access the data memory 223 for the purpose of MAC header analysis can also be shortened. Furthermore, a period in which the processor 221 accesses the data memory 223, that access does not occupy the bus 226, which can be used for another data transfer.

In this case, the transfer amount decision unit 232 of the data transfer unit 225 decides an optimal size (Lframe_cont) of the received frame information according to the frame. Hence, even unnecessary information can be prevented from being transferred to the data memory 223, thus shortening a time required for information transfer.

As a result, a time required until the processor 221 analyzes the MAC header can be shortened. Hence, this embodiment can support a wireless communication method which has to immediately return a response frame upon reception of data, thus realizing a wireless communication apparatus which can support a plurality of wireless communication methods.

Second Embodiment

A wireless communication apparatus according to the second embodiment will be described below. This embodiment relates to a case in which a wireless communication apparatus 200 includes a plurality of processors in the first embodiment. Only differences from the first embodiment will be explained below.

<Arrangement of Wireless Communication Apparatus 200>

FIG. 10 is a block diagram of a wireless communication apparatus 200 according to this embodiment. As in the first embodiment, the wireless communication apparatus 200 can be applied to a wireless LAN base station 101 and/or wireless LAN terminals 102 and 103 shown in FIG. 1. A case will also be exemplified below wherein the wireless communication apparatus 200 is applied to the wireless LAN terminal 102.

As shown in FIG. 10, the wireless communication apparatus 200 according to this embodiment further includes a processor 241 and second data transfer unit 240 in the arrangement shown in FIG. 2 described in the first embodiment. Note that a data transfer unit 225 will also be referred to as a first data transfer unit 225 to be distinguished from the second data transfer unit 240.

The processor 241 has the same arrangement as a processor 221, and includes an instruction memory 242 and data memory 243. The functions of the instruction memory 242 and data memory 243 are the same as those of an instruction memory 222 and data memory 223.

The arrangement of the first data transfer unit 225 is as shown in FIG. 5 described in the first embodiment, and its functions are the same as the first embodiment, except that received frame information is transferred to the second data transfer unit 240. The operation for transferring a received frame to a main memory 224, and the operations of a transfer amount decision unit 232 are the same as those in the first embodiment.

The second data transfer unit 240 receives received frame information (and a received frame) from the data transfer unit 225, and transfers it (them) to the data memories 223 and 243. FIG. 11 shows the arrangement of the second data transfer unit 240. FIG. 11 is a block diagram of the second data transfer unit 240. As shown in FIG. 11, the second data transfer unit 240 includes a transfer control unit 250, reception storage unit 251, and transmission storage unit 252.

At the time of reception of a MAC frame, the transfer control unit 250 controls to transfer a received frame and received frame information including a MAC header and reception control information, which are stored in the reception storage unit 251 by the first data transfer unit 225, to the data memories 223 and 243. On the other hand, at the time of transmission of a MAC frame, the transfer control unit 250 controls to transfer a MAC frame, which is prepared by the processor 221 (and/or the processor 241) in the data memory 223 (and/or the data memory 243) and transmission control information including a transmission transfer rate and MAC frame length from the data memory 223 (and/or the data memory 243) to the transmission storage unit 252. The first data transfer unit 225 reads out the MAC frame and transmission control information stored in the transmission storage unit 252.

In the transfer control unit 250, some parameters are set in advance for transfer control of the received frame information. These parameters are, for example, as follows.

Transfer destination memory addresses A1-1 and A1-2 for transferring reception control information to the data memories 223 and 243. These addresses are those in the data memories 223 and 243.

Location information of a storage area of the reception control information in the reception storage unit 251. For example, the reception storage unit 251 includes a plurality of FIFOs, and this information indicates a FIFO that stores the reception control information of these FIFOs (e.g., FIFO1).

Transfer destination memory addresses A2-1 and A2-2 for transferring a MAC header to the data memories 223 and 243. These addresses are those in the data memories 223 and 243.

Location information of a storage area of the MAC header in the reception storage unit 251. For example, the reception storage unit 251 includes a plurality of FIFOs, and this information indicates a FIFO that stores the MAC header of these FIFOs (e.g., FIFO2).

FIG. 12 is a flowchart showing the operation of the transfer control unit 250, and especially shows a case in which a frame is received from the first data transfer unit 225. The operation of the transfer control unit 250 at the time of reception of a frame nearly corresponds to FIG. 7 described in the first embodiment except for steps S22 to S24, S28, and S29, and transfer of the received frame.

As shown in FIG. 12, in the transfer control unit 250, the transfer destination addresses A1-1, A1-2, A2-1, and A2-2 are set, and pieces of location information (e.g., FIFO1 and FIFO2) in the reception storage unit 251 are set (step S40).

After that, the transfer control unit 250 stores received frame information transferred from the first data transfer unit 225 in the reception storage unit 251 (step S41). The storage area of the received frame information is that set in step S40. In the above example, reception control information is stored in FIFO1 of the reception storage unit 251, and a MAC header is stored in FIFO2.

The transfer control unit 250 transfers the received frame information to the areas starting from the addresses A1-1 and A2-1 of the data memory 223 and the areas starting from the addresses A1-2 and A2-2 of the data memory 243 (step S42). Upon completion of transfer, the transfer control unit 250 issues a completion notification to the processors 221 and 241 (step S43). Then, the transfer control unit 250 updates the addresses A1-1, A1-2, A2-1, and A2-2 (step S44). At the time of next frame transfer, the addresses updated in step S44 are used.

As described above, the received frame information is transferred to the processors 221 and 241. The data memories 223 and 243 at the time of data transfer will be described below with reference to FIG. 13. FIG. 13 shows the memory spaces of the data memories 223 and 243 to which the received frame information is transferred by the transfer control unit 250. Assume that the value of the transfer destination memory address A1-1 is "address ADD3", that of the transfer destination memory address A2-1 is "address ADD1", that of the transfer destination memory address A1-2 is "address ADD9", and that of the transfer destination memory address A2-2 is "address ADD7". Therefore, in the data memory 223, reception control information INF1 and a MAC header H1 are respectively stored in areas starting from the addresses ADD3 and ADD1. In the data memory 243, the reception control information INF1 and MAC header H1 are respectively stored in areas starting from the addresses ADD9 and ADD7. Since the transfer control unit 250 recognizes the sizes of the reception control information INF1 and MAC header H1, it can also detect next areas required to store these pieces of information. Thus, the transfer destination memory address A1-1 is updated to "address ADD4", the transfer destination memory address A2-1 is updated to "address ADD2", the transfer destination memory address A1-2 is updated to "address ADD10", and the transfer destination memory address A2-2 is updated to "address ADD8".

<Operation of Wireless Communication Apparatus 200>

Figure 14:
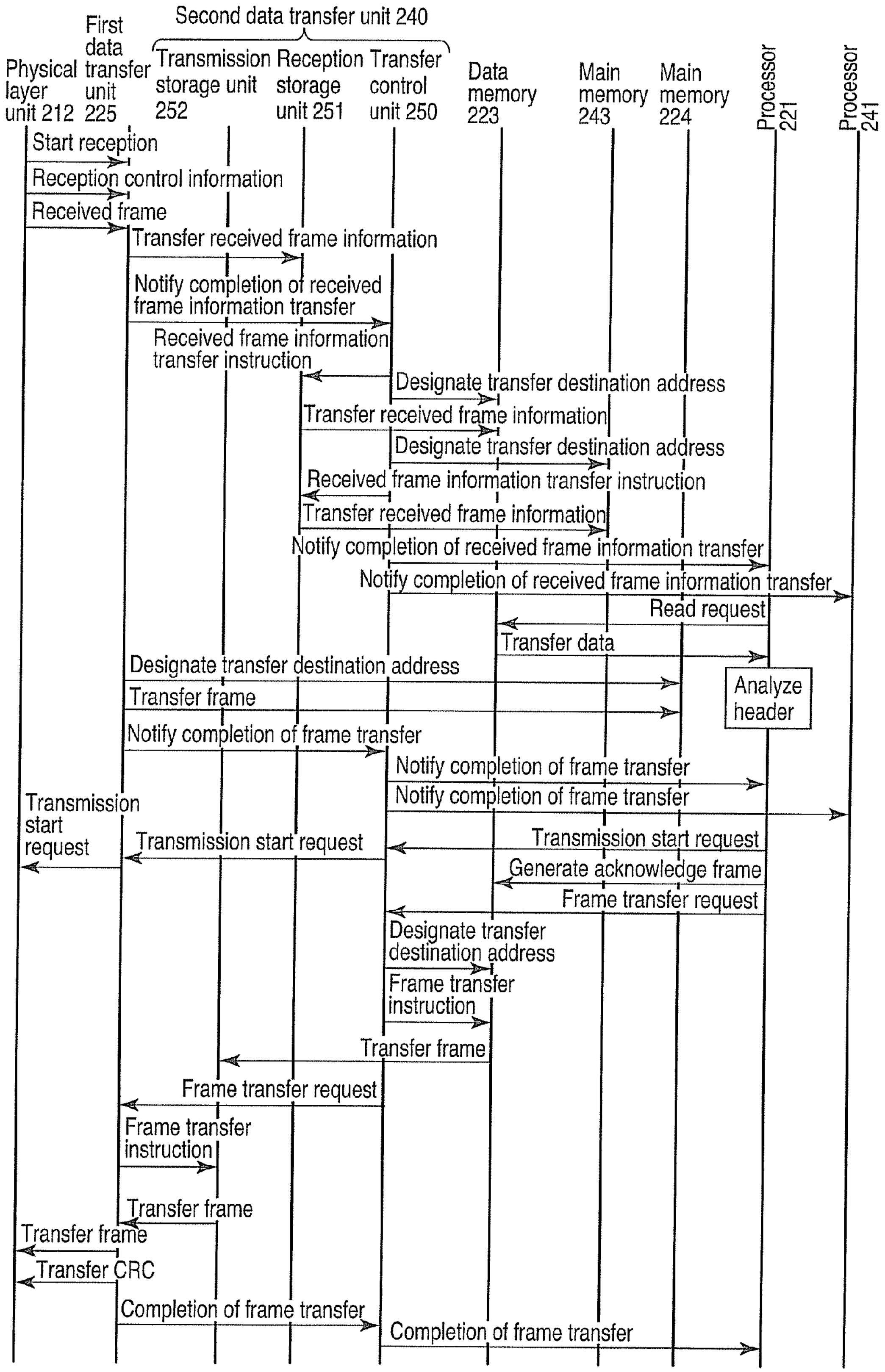
FIG. 14 is a flowchart of a wireless communication method according to the second embodiment.

The wireless communication operation according to this embodiment will be described below while taking as an example the operation of the wireless LAN terminal 102 executed when it receives a data frame from the wireless LAN base station 101, and returns an ACK frame to the wireless LAN base station 101. FIG. 14 is a flowchart showing the operation of the wireless communication apparatus 200 as the wireless LAN terminal 102.

The same operations as in the first embodiment are performed until a MAC frame is stored in the reception storage unit 231 of the first data transfer unit 225, and the transfer amount decision unit 232 calculates Lframe_cont. After that, the first data transfer unit 225 transfers received frame information including a MAC header and reception control information to the reception storage unit 251 in the second data transfer unit 240. Upon completion of transfer, the transfer control unit 230 notifies the transfer control unit 250 in the second data transfer unit 240 of completion of transfer of the received frame information.

The first data transfer unit 225 transfers a received frame to an area starting from a specific address (an address A3 in the example of the first embodiment) of the main memory 224. After completion of transfer of the received frame, the data transfer unit 225 notifies the transfer control unit 250 of completion of frame transfer together with a CRC check result.

The second data transfer unit 240 transfers the received frame information transferred from the data transfer unit 225 to the data memories 223 and 243 of the processors 221 and 241. That is, the transfer control unit 250 designates the address A1-1 of an area as the transfer destination of the received frame information in the data memory 223, and instructs the reception storage unit 251 to transfer the received frame information. In response to this instruction, the reception storage unit 251 transfers the received frame information to the data memory 223. After completion of transfer, the transfer control unit 250 notifies the processor 221 of completion of transfer of the received frame information. The transfer control unit 250 performs the same operation also for transfer to the data memory 243, and notifies the processor 241 of completion of transfer of the received frame information.

Note that in FIG. 14, the received frame information is transferred from the second data transfer unit 240 to the data memory 223 first and is then transferred from the second data transfer unit 240 to the data memory 243 and, after that, a MAC frame is transferred to the main memory 224. However, the transfer order is not limited to this.

That is, when a bus 226 is not busy (it is available) after the first data transfer unit 225 notifies the second data transfer unit 240 of completion of transfer of the received frame information, it can transfer the received frame parallel to transfer of the received frame information between the second data transfer unit 240 and the data memories 223 and 243.

That is, since the second data transfer unit 240 is arranged, even when the number of processors is increased, the bus 226 can be avoided from being occupied by transfer of the received frame information. In this way, a delay time until the data transfer unit 225 starts transfer of the received frame to the main memory 224 can be minimized.

On the other hand, after the processor 221 receives the transfer completion notification of the received frame information from the transfer control unit 250, it reads out the MAC header from the data memory 223, and analyzes its contents. The processing contents at this time are the same as those in the first embodiment, and a description thereof will not be repeated.

If the processor 221 judges that an ACK frame is required to be returned, it notifies the transfer control unit 250 of a transmission start request. The transfer control unit 250, which received that notification, notifies the transfer control unit 230 of the first data transfer unit 225 of the transmission start request, and the transfer control unit 230 notifies a physical layer unit 212 of the transmission start request.

When the processor 221 generates an ACK frame, it stores that frame in the data memory 223. Then, in order to transfer the ACK frame to the physical layer unit 212, the processor 221 notifies the transfer control unit 250 of the address of a storage area of the ACK frame in the data memory 223 and the length (for example, 10 bytes) of the ACK frame, together with a frame transfer request.

The transfer control unit 250 reads out the ACK frame stored at the notified address from the data memory 223, and stores it in the transmission storage unit 252.

After that, the transfer control unit 250 issues a frame transfer request to the transfer control unit 230 of the first data transfer unit 225. Then, the transfer control unit 230 reads out the ACK frame from the transmission storage unit 252 to the transmission storage unit 234. After that, the first data transfer unit 225 controls to transfer the ACK frame appended with a CRC to the physical layer unit 212.

The first data transfer unit 225 then notifies the transfer control unit 250 of completion of transfer of the frame, and the transfer control unit 250 notifies the processor 221 of completion of transfer of the transmission frame.

Note that when the processor 221 or 241 transfers a transmission frame (an ACK frame in this case) to the physical layer unit 212, the ACK frame need not always be temporarily stored in the transmission storage unit 252 in the second data transfer unit 240, and then be transferred to the data transfer unit 225. For example, as another method, the transmission storage unit 252 in the second data transfer unit 240 may be omitted, and the processor 221 or 241 may directly transfer a transmission frame from the data memory 223 or 243 to the first data transfer unit 225 as in the first embodiment.

<Effect in this Embodiment>

By adopting the arrangement according to this embodiment, even in case of a wireless communication apparatus having a plurality of processors, a time in which the bus is occupied by transfer of a MAC header to the data memory of the processor can be shortened, and the same effect as in the first embodiment can be obtained.

Note that the above embodiment has exemplified the case in which the two processors 221 and 241 are embedded in the wireless communication apparatus 200. However, the number of processors is not limited to two, but three or more processors may be used. Even the three or more processors are connected to the bus 226 via the second data transfer unit 240.

The reason why the received frame information is transferred not only to the processor 221 but also to the processor 241 is to inform the processor 241, which does not perform actual ACK frame processing, that a response is required. Of course, the ACK frame may be generated by the processor 241 in place of the processor 221. Furthermore, the ACK frame may be generated by both the processors 221 and 241 in some cases.

Third Embodiment

A wireless communication apparatus according to the third embodiment will be described below. In this embodiment, the first embodiment is applied to another wireless communication method (e.g., IEEE802.16). Only differences from the first embodiment will be explained below.

<Arrangement>

The arrangement of a wireless communication system according to this embodiment is as shown in FIG. 1 described in the first embodiment. A wireless base station 101 and wireless terminals 102 and 103 are programmed to be able to communicate with each other based on the IEEE802.16 wireless standard (also including, e.g., IEEE802.16e). A wireless communication apparatus according to this embodiment may be applied to either the wireless base station 101 or the wireless terminal 102 or 103. A case will be exemplified below wherein the wireless communication apparatus is applied to the wireless terminal 102.

The arrangement of a wireless communication apparatus 200 according to this embodiment is as shown in FIG. 2 and FIG. 5 described in the first embodiment. Also, the processing sequence upon transmitting/receiving a wireless signal in the wireless communication apparatus 200 according to this embodiment is basically the same as that described in the first embodiment. Differences are that frequency bands supported by an antenna 210 and RF unit 211 are different from those of a wireless LAN (for example, 2.3-GHz, 2.5-GHz, and 2.6-GHz bands are used), and transmission/reception processing in a physical layer unit 212 is configured to satisfy functions and performances specified in the IEEE802.16 standard.

<Configuration Example of MAC Frame>

The configuration of a MAC frame in the wireless communication system compliant with the IEEE802.16 standard will be described below. FIG. 15 shows the format of a MAC frame.

As shown in FIG. 15, the MAC frame includes a Generic MAC header (to be simply referred to as a MAC header hereinafter), Payload, and CRC. The MAC header includes an HT field, EC field, Type field, ESF field, CI field, Rsv field, LEN field, CID field, and HCS field. The HT field indicates that the Payload follows the MAC header. The EC field indicates whether or not the Payload is encrypted. The Type field indicates that the Payload includes special information. The ESF field indicates that a sub-header exists immediately after the MAC header. The CI field indicates whether or not a CRC is appended to the Payload. In the EKS field, information associated with an encryption key is set. The LEN field indicates the length of the MAC frame. The CID field is used to discriminate the connection type of a communication between the base station and terminal. The HCS field indicates whether or not the MAC header can be normally received. Note that the Rvs field includes a Reserved bit, and "0" is always set.

<Operation of Wireless Communication Apparatus 200>

Figure 16:
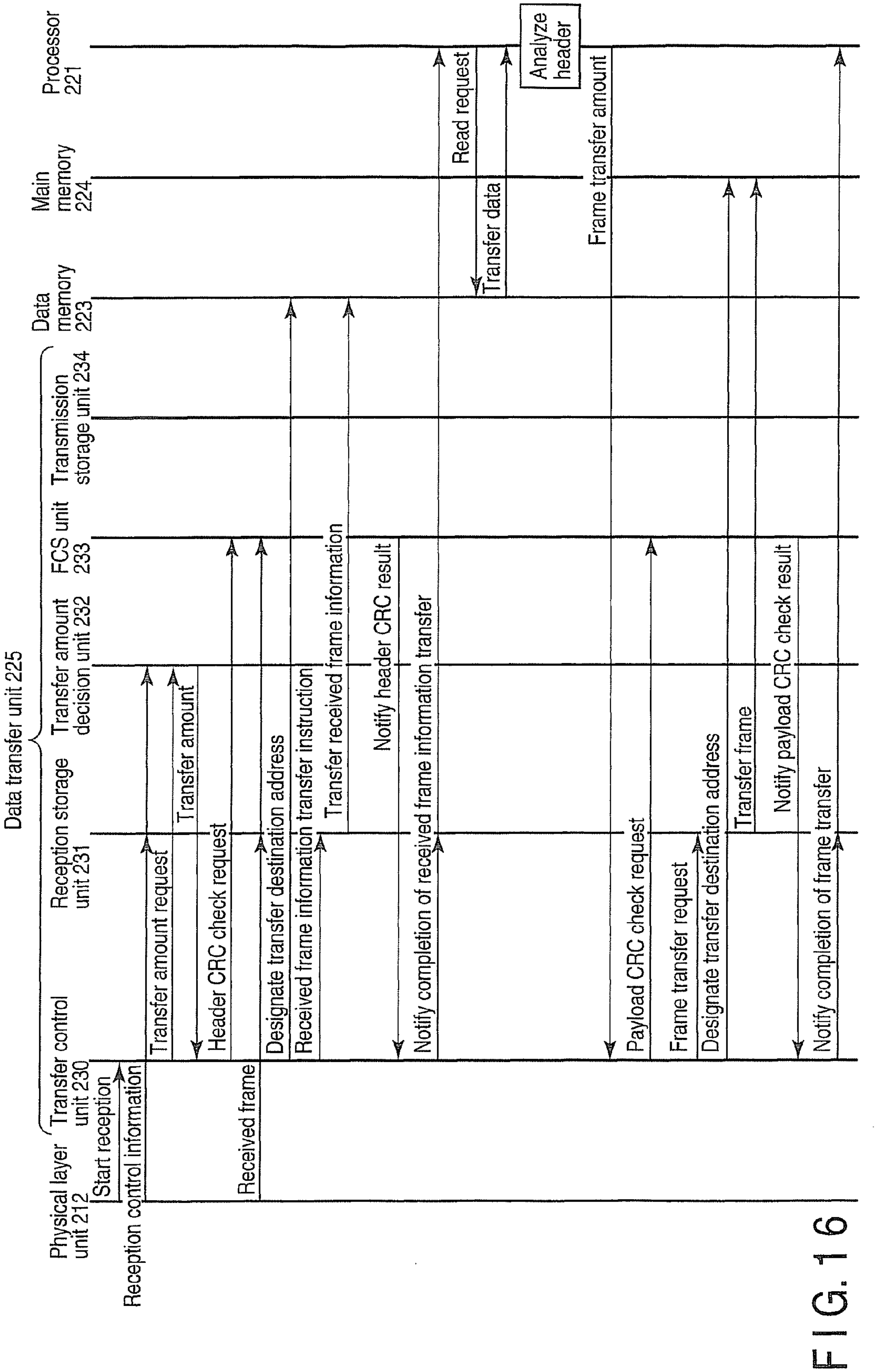
FIG. 16 is a flowchart of a wireless communication method according to the third embodiment.

The operation executed until the wireless terminal 102 transfers a received data frame to a memory will be described below with reference to FIG. 16. FIG. 16 is a flowchart showing the operation of the wireless communication apparatus 200 according to this embodiment.

The basic operation sequence is the same as that of the first embodiment. Since a CRC is also appended to the MAC header, and the length of the MAC frame is set in the MAC header in the third embodiment, however, a part of the processing sequence slightly differs from the first embodiment.

As shown in FIG. 16, the physical layer unit 212 issues a reception start signal before it stores a received frame in a reception storage unit 231. Also, the physical layer unit 212 transfers reception control information including a reception transfer rate and received frame length to the reception storage unit 231 during an interval after issuance of the reception start signal until it actually starts transfer of the received frame. Of this reception control information, information of at least the MAC frame length is also supplied to a transfer amount decision unit 232.

Next, a transfer control unit 230 requests the transfer amount decision unit 232 to decide a transfer amount (Lframe_cont) of received frame information to be transferred. The transfer control unit 230 acquires the transfer amount (Lframe_cont) of the received frame information from the transfer amount decision unit 232. Then, the transfer control unit 230 recognizes the length (for example, a total of 10 bytes if the length of reception control information is 4 bytes and that of a MAC header is 6 bytes) of the received frame information to be transferred to a data memory 223.

The transfer control unit 230 requests an FCS unit 233 to execute CRC check processing of the 6-byte MAC header to be stored in the reception storage unit 231. After that, the physical layer unit 212 begins to store the received frame in the reception storage unit 231 after elapse of a predetermined fixed time (e.g., 1 μs) since the reception start signal.

Next, the transfer control unit 230 designates areas used to store the received frame information in the data memory 223. As for the reception control information of the received frame information, an area starting from an address A1 (an address ADD3 in the example of FIG. 8) of the data memory 223 is designated. Also, as for the MAC header, an area starting from an address A2 (an address ADD1 in the example of FIG. 8) is designated. After that, the transfer control unit 230 instructs the reception storage unit 231 to transfer the received frame information.

In response to this instruction, the reception storage unit 231 transfers the reception control information having a length of 4 bytes from a predetermined area (e.g., FIFO1) in itself to the area starting from the address A1 of the data memory 223. Also, the reception storage unit 231 transfers the MAC header having a length of 6 bytes from a predetermined area (e.g., FIFO2) in itself to the area starting from the address A2 of the data memory 223. Upon completion of transfer of the received frame information, the transfer control unit 230 notifies a processor 221 of completion of transfer of the received frame information.

On the other hand, after reception of the transfer completion notification of the received frame information from the transfer control unit 230, the processor 221 reads out the MAC header from the data memory 223. More specifically, an arithmetic unit of the processor 221 issues a read request to the data memory 223. In response to this request, the MAC header is transferred from the data memory 223 to the arithmetic unit of the processor 221. The processor 221 then analyzes the contents of the readout MAC header. In this case, the processor 221 recognizes the length of the MAC frame to be received by checking the LEN field of the MAC header. After that, the processor 221 notifies the transfer control unit 230 of a frame transfer amount (for example, 134 bytes) as the length of the MAC frame.

The transfer control unit 230 which received that notification requests the FCS unit 233 to execute payload CRC check processing for a payload stored in the reception storage unit 231.

Subsequently, the transfer control unit 230 designates an area used to store the received frame in a main memory 224. This area is that starting from an address A3 (an address ADD5 in the example of FIG. 8) of the main memory 224. Furthermore, the transfer control unit 230 instructs the reception storage unit 231 to transfer the received frame.

In response to this instruction, the reception storage unit 231 transfers the received frame having a length of 134 bytes from a predetermined area (e.g., FIFO3) in itself to the area starting from the address A3 of the main memory 224. Upon completion of transfer of the received frame, the transfer control unit 230 notifies the processor 221 of completion of frame transfer together with the payload CRC check result (information indicating if a CRC is OK or NG) from the FCS unit 233.

<Effect in this Embodiment>

As described above, the first embodiment can be applied to the wireless communication apparatus compliant with various wireless communication standards other than a wireless LAN. Note that this embodiment can also be applied to the second embodiment. That is, in this embodiment, the wireless communication apparatus 200 may include a plurality of processors.

Fourth Embodiment

A wireless communication apparatus 200 according to the fourth embodiment will be described below. This embodiment relates to a case in which an aggregation frame obtained by aggregating a plurality of MAC frames is to be received in the first embodiment. Aggregation of frames is specified in the IEEE802.11n standard.

<Configuration Example of Aggregation Frame>

Figure 17:
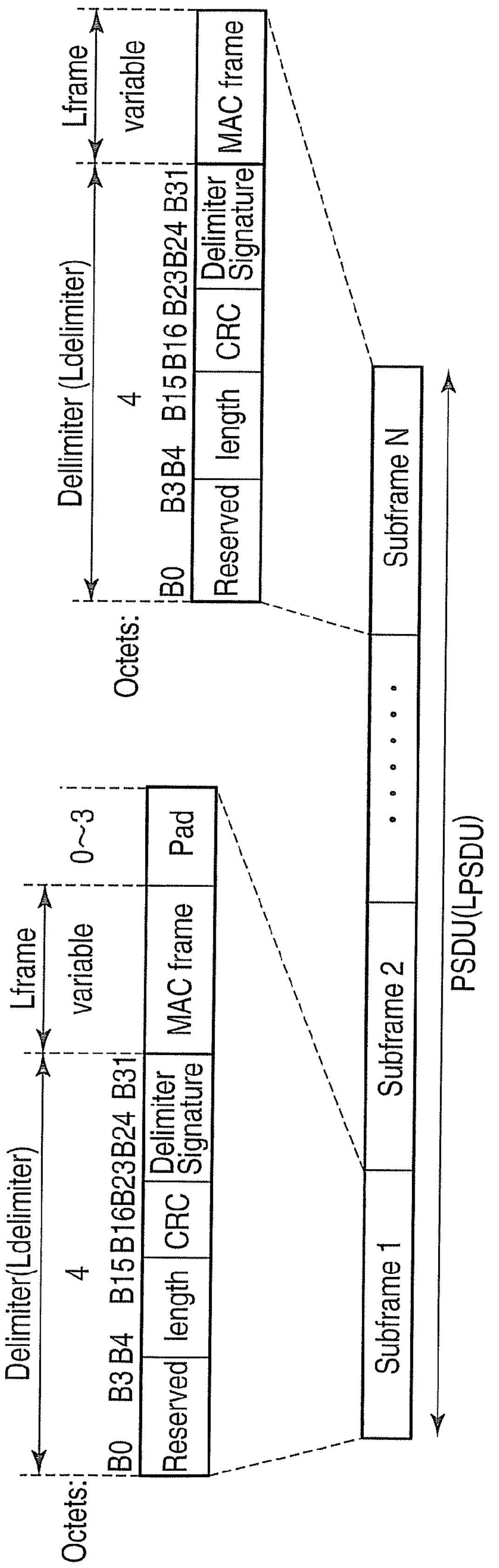
FIG. 17 is a view of a MAC frame according to the fourth embodiment.

FIG. 17 shows a configuration example of an aggregation frame in which one PSDU (PLOP Service Data Unit) includes a plurality of MAC frames in the IEEE802.11 standard.

As shown in FIG. 17, a PSDU frame is configured as a frame obtained by aggregating N (N is a positive integer) subframes. Each subframe includes a delimiter field used to detect a boundary between subframes, and a MAC frame. Note that the length (frame length) of the entire PSDU is called $L_{PSDU}$, and that of each individual delimiter is called Ldelimiter. Also, Lframe is the length of a MAC frame included in each subframe.

The delimiter field has a length of 4 bytes (Ldelimiter=4 bytes), and includes a Reserved field, length field, CRC field, and Delimiter Signature field. Numerical values such as "B0" in FIG. 17 indicate bit positions in the Delimiter field. The Reserved field is a field, which is reserved, and is set with a certain constant value. The length field indicates the length of a following MAC frame. The CRC field is used to detect an error in the length field. The Delimiter Signature field is used to identify that this field is the delimiter field.

The format of the MAC frame which follows the Delimiter field is as shown in FIG. 3. Note that a Pad field illustrated after the MAC frame is appended by only 1 to 3 bytes to attain a multiple of 4 bytes when the subframe length is not a multiple of 4 bytes. However, no Pad frame is appended to the last subframe of the PSDU.

<Arrangement of Wireless Communication Apparatus 200>

The arrangement of the wireless communication apparatus 200 is as described in the first embodiment, except for some operations. The operations of a transfer amount decision unit 232 and transfer control unit 230 in a data transfer unit 225 will be described below.

<Operation of Transfer Amount Decision Unit 232>

Figure 18:
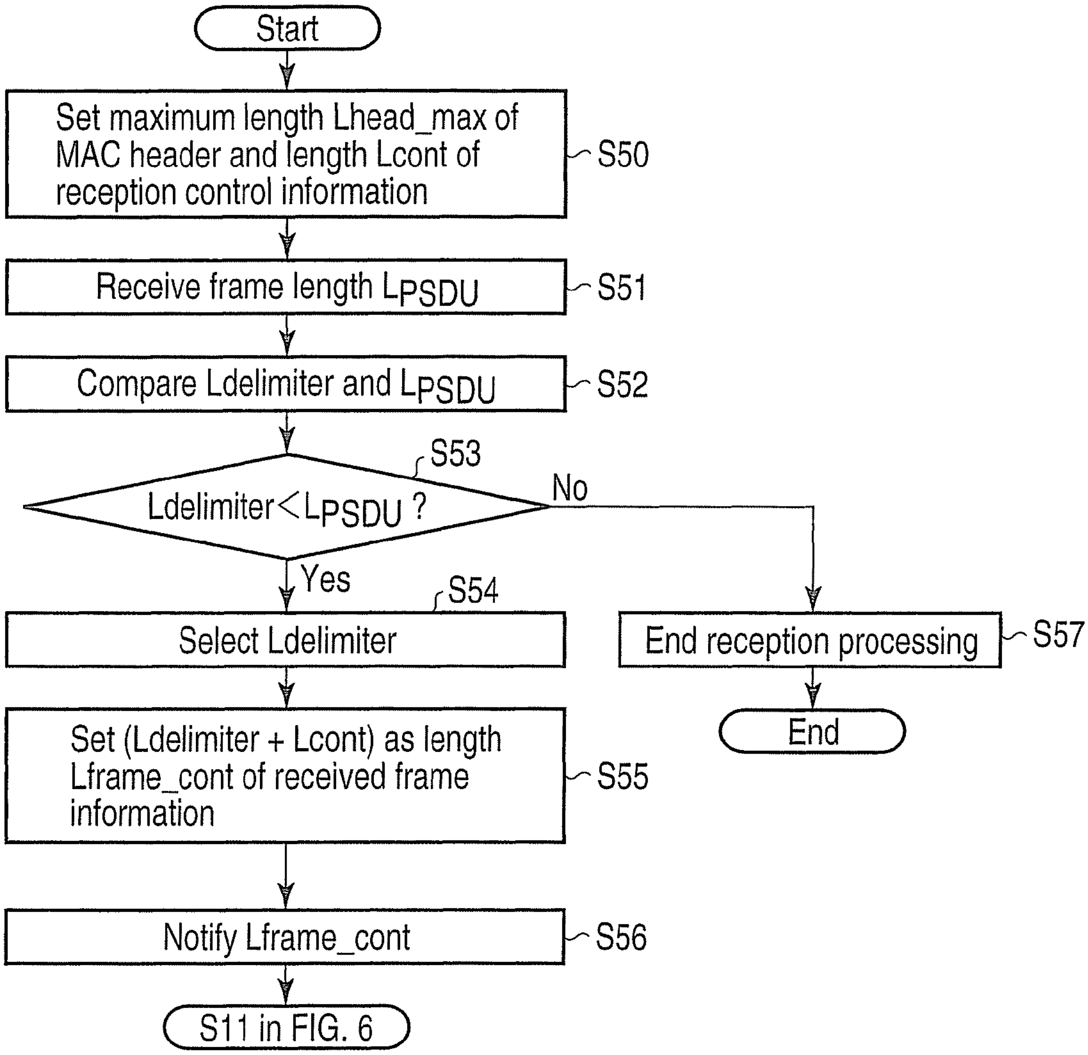
FIG. 18 is a flowchart showing the operation of a transfer amount decision unit according to the fourth embodiment.

FIG. 18 is a flowchart showing the operation of the transfer amount decision unit 232 according to this embodiment. There are two types of received frame information according to this embodiment: one information has the same contents as in the first embodiment, and the other information is a combination of a Delimiter and reception control information. The reception control information includes a reception transfer rate, transfer frame lengths (i.e., the length Lframe of each MAC frame and the length $L_{PSDU}$ of the PSDU), and an identification signal indicating an aggregation frame (in a wireless LAN, since this identification information is set in a PHY header, a physical layer unit 212 can recognize that a received frame is an aggregated frame upon reception of an aggregation frame).

As in the first embodiment, in the transfer amount decision unit 232, a maximum length Lhead_max of a MAC header, and a length Lcont of reception control information are set in advance (step S50). As described above, the maximum length Lhead_max of the MAC header is, for example, 36 bytes, and the length Lcont of the reception control information is, for example, 4 bytes.

Then, the transfer amount decision unit 232 receives the frame length $L_{PSDU}$ of the received PSDU from, e.g., the physical layer unit 212 (step S51). The transfer amount decision unit 232 compares the received frame length $L_{PSDU}$ notified from the physical layer unit 212, and the length Ldelimiter of the delimiter field (step S52). Ldelimiter may be set in advance in, e.g., step S50, or may be supplied from, e.g., the physical layer unit 212.

Normally, in the aggregation frame, Ldelimiter$<L_{PSDU}$ (YES in step S53). In this case, the transfer amount decision unit 232 selects the delimiter length Ldelimiter (step S54), sets (Ldelimiter+Lcont) as the length Lframe_cont of the received frame information (step S55), and notifies the transfer control unit 230 of that length (step S56). That is, Lframe_cont=Ldelimiter (4 bytes)+Lcont (4 bytes)=8 bytes.

After that, the process advances to step S11 in FIG. 6 described in the first embodiment. That is, the MAC frame length Lframe of each subframe is received, and a length Lframe_cont of received frame information associated with that subframe is calculated. This received frame information is, for example, a combination of a MAC header and reception control information, as in the first embodiment (it may include a MAC header alone).

On the other hand, if Ldelimiter$\geqq L_{PSDU}$ (NO in step S53), the transfer amount decision unit 232 ends reception processing (step S57).

<Operation of Transfer Control Unit 230>

The operation of the transfer control unit 230 will be described below with reference to FIG. 19. FIG. 19 is a flowchart showing the operation of the transfer control unit 230, and especially shows a case in which a frame is received from the physical layer unit 212.

As in the first embodiment, in the transfer control unit 230, transfer destination addresses A1 to A3 are set, and pieces of location information in a reception storage unit 231 (for example, FIFO1 to FIFO3) are set (step S60). In this case, a transfer destination address A4 and location information (FIFO4) in the reception storage unit 231 are further set. The transfer destination address A4 is that of an area to which a delimiter is to be transferred in a data memory 223, and FIFO4 is an area to which the delimiter is to be transferred in the reception storage unit 231.

After that, the transfer control unit 230 stores reception control information transferred from the physical layer unit 212 in the area (for example, FIFO1) set in step S60 in the reception storage unit 231 (step S61).

The transfer control unit 230 then instructs the transfer amount decision unit 232 to decide a length Lframe_cont of received frame information (step S62), and acquires this value Lframe_cont (step S63). In this case, the received frame information whose length Lframe_cont is to be calculated is a combination of a delimiter and reception control information.

Next, the transfer control unit 230 instructs an FCS unit 233 to execute CRC check processing (step S64). In this case, the CRC check target is a delimiter. After that, the transfer control unit 230 stores a subframe transferred from the physical layer unit 212 in the reception storage unit 231 (step S65). The area that stores the subframe is that set in step S60. That is, the subframe is stored in FIFO3, and a delimiter in that subframe is stored in FIFO4.

After that, the transfer control unit 230 transfers the received frame information to the areas starting from the addresses A1 and A4 of the data memory 223 (step S66). Upon completion of transfer, the transfer control unit 230 issues a completion notification to a processor 221 (step S67). In this case, the size of the received frame information is that acquired in step S63.

Furthermore, the transfer control unit 230 receives a MAC transfer amount (MAC frame length Lframe) of the subframe from the processor 221 (step S68). Then, in response to this, the transfer control unit 230 instructs the transfer amount decision unit 232 to decide a length Lframe_cont of the received frame information (step S69), and acquires this value Lframe_cont (step S70). In this case, the received frame information whose length Lframe_cont is to be calculated is, for example, a MAC header (or a combination of the MAC header and reception control information). As a result, since the length of the MAC header to be transferred to the data memory 223 can be detected, the transfer control unit 230 transfers the MAC header (or the MAC header and reception control information) in, e.g., FIFO2 in the reception storage unit 231 to the area starting from the address A2 of the data memory 223 (step S71), and transmits a completion notification to the processor 221 (step S72).

Furthermore, the transfer control unit 230 transfers the MAC frame in, e.g., FIFO3 in the reception storage unit 231 to the area starting from address A3 of a main memory 224 (step S73), and transmits a completion notification to the processor 221 (step S74).

After that, as in the first embodiment, the transfer control unit 230 updates the addresses A1 to A4 (step S75). If another transfer request is not received from the processor 221 (NO in step S76), the processing ends. On the other hand, if another transfer request is received (YES in step S76), the process returns to step S64 to repeat the same processes for the next subframe.

<Operation of Wireless Communication Apparatus 200>

The operation of the wireless communication apparatus 200 with the above arrangement will be described below while taking as an example the operation of a wireless LAN terminal 102 during a period in which it receives an Aggregation frame, and returns an ACK frame to a wireless LAN base station 101.

<Rough Sequence of Operation>

A rough sequence of the operation will be described below with reference to FIG. 20. FIG. 20 is a flowchart showing the operation of the wireless communication apparatus 200. Roughly speaking, the length of received frame information (including a delimiter) is calculated first. After that, transfer of the delimiter, calculation of the length of received frame information (including a MAC header), MAC header transfer, and MAC frame transfer are repeated for respective subframes.

As shown in FIG. 20, upon reception of a frame, the wireless communication apparatus 200 recognizes that the received frame is an aggregation frame (step S80). Then, the transfer amount decision unit 232 decides Lframe_cont=reception control information+Ldelimiter according to the determination operation described above using FIG. 18 (step S81).

Then, data transfer of a first subframe SF1 is started (i=1; i is a natural number equal to or larger than 1 and equal to or smaller than N; step S82). The data transfer unit 225 transfers received frame information associated with a subframe SFi to the processor 221 (step S83). As described above, the received frame information is a combination of reception control information and a delimiter associated with the subframe SFi. The processor 221 analyzes the received delimiter (step S84), thereby calculating a MAC frame length Lframe of the subframe SFi (step S85).

Then, the transfer amount decision unit 232 calculates Lframe_cont associated with the subframe SFi based on the calculated Lframe (step S86). This calculation method is as shown in FIG. 6 described in the first embodiment. Then, the data transfer unit 225 transfers a MAC header (or the MAC header and reception control information) of the subframe SFi based on the calculated Lframe_cont to the data memory 223 (step S87), and then transfers the entire MAC frame of the subframe SFi to the main memory 224 (step S88). In this way, data transfer associated with one subframe SFi is complete.

After that, the processor 221 judges whether or not the data amount of the processed subframes SFi is smaller than the PSDU size (step S89). If the processed data amount is not smaller than the PSDU size (NO in step S89), since data transfer associated with all subframes SF1 to SFN is complete, the processor 221 executes processing for returning an ACK frame (for example, a BlockACK frame) (step S90).

On the other hand, if it is judged in step S89 that the processed data amount is smaller than the PSDU size (YES in S89), since subframes to be transferred still remain, transfer of the next subframe SF(i+1) is started (step S91). For this purpose, the processor 221 issues a transfer instruction of the next subframe SF(i+1) to the data transfer unit 225 (step S92), and the process returns to step S83.

<Detailed Sequence of Operation>

Figure 21:
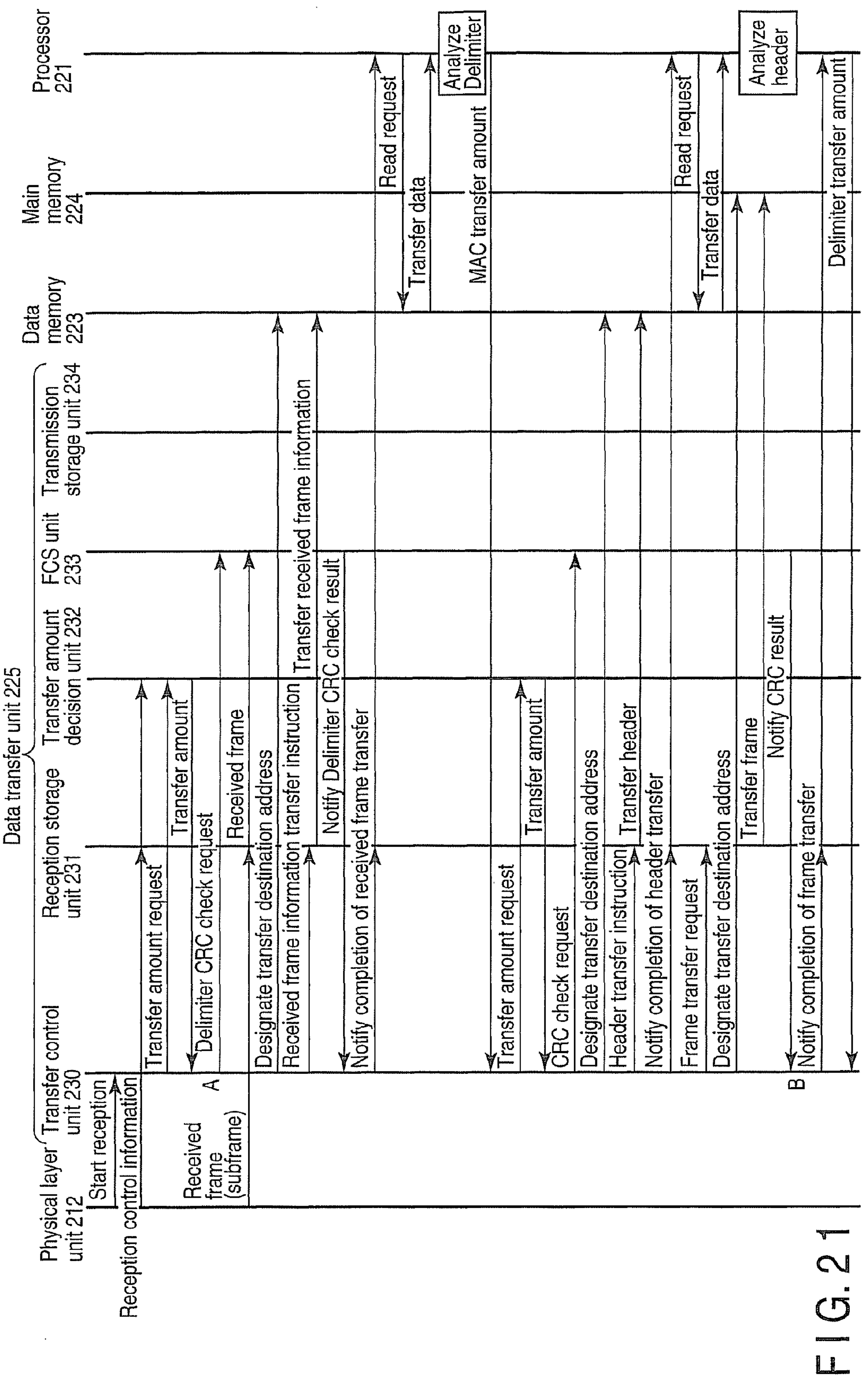

Details of the operation of the wireless communication apparatus 200 upon execution of FIG. 20 will be described below with reference to FIG. 21. FIG. 21 is a flowchart showing the operation of the wireless communication apparatus 200. The basic operation sequence is the same as in the first embodiment. However, in an aggregation frame according to this embodiment, since the sequence for analyzing a delimiter is added first for the purpose of recognizing a MAC frame length, the processing sequence is slightly different from the first embodiment.

As shown in FIG. 21, the physical layer unit 212 issues a reception start signal before it stores a received PSDU frame in the reception storage unit 231. With this signal, the physical layer unit 212 notifies the transfer control unit 230 of start of transfer of a received frame from itself. The physical layer unit 212 transfers the aforementioned reception control information to the reception storage unit 231 during an interval after issuance of the reception start signal until it actually starts transfer of the received frame. The reception control information is also supplied to the transfer amount decision unit 232.

Next, the transfer control unit 230 requests the transfer amount decision unit 232 to decide a transfer amount (Lframe_cont) of received frame information to be transferred. The received frame information whose amount is to be decided is a combination of a delimiter and reception control information. In response to this request, the transfer control unit 230 recognizes the length (for example, Lframe_cont=4 bytes (reception control information)+4 bytes (delimiter)=8 bytes) of the received frame information to be transferred to the data memory 223.

The transfer control unit 230 requests the FCS unit 233 to execute CRC check processing of the 4-byte delimiter stored in the reception storage unit 231. After that, the physical layer unit 212 begins to store a subframe of the received PSDU frame in the reception storage unit 231 after elapse of a predetermined fixed time (e.g., 1 μs) since the reception start signal. The subframe is also transferred to the FCS unit 233.

Next, the transfer control unit 230 designates areas used to store the received frame information in the data memory 223. As for the reception control information of the received frame information, an area starting from the address A1 is designated. Also, as for the delimiter, an area starting from the address A4 is designated. After that, the transfer control unit 230 instructs the reception storage unit 231 to transfer the reception control information and delimiter to the designated areas. This delimiter is that of the first subframe SF1, as a matter of course. Upon completion of transfer of the received frame information, if the delimiter CRC check result from the FCS unit 233 is OK, the transfer control unit 230 notifies the processor 221 of completion of transfer of the received frame information.

On the other hand, after reception of the transfer completion notification of the received frame information from the transfer control unit 230, the processor 221 reads out the delimiter from the data memory 223. More specifically, an arithmetic unit of the processor 221 issues a read request to the data memory 223. In response to this request, the delimiter is transferred from the data memory 223 to the arithmetic unit of the processor 221. The processor 221 then analyzes the contents of the readout delimiter. In this case, the processor 221 recognizes the length of a MAC frame of the subframe SF1 by confirming the length field in the delimiter. Then, the processor 221 notifies the transfer control unit 230 of a frame transfer amount (for example, 134 bytes) as the length of the MAC frame.

The transfer control unit 230 which received this notification requests the transfer amount decision unit 232 to decide a transfer amount (Lframe_cont) of the received frame information to be transferred. The received frame information whose amount is to be decided in this case is a MAC header (and reception control information) of the subframe SF1. In response to this request, the transfer control unit 230 recognizes the length of the received frame information to be transferred to the data memory 223. Subsequently, the transfer control unit 230 requests the FCS unit 233 to execute frame CRC check processing for the MAC frame (subframe) stored in the reception storage unit 231.

After that, the transfer control unit 230 designates an area (that starting from the address A2) used to store the MAC header in the data memory 223. Then, the transfer control unit 230 transfers the MAC header (or the MAC header and reception control information) of the subframe SF1 from FIFO2 in the reception storage unit 231 to the designated area in the data memory 223, and notifies the processor 221 of completion of transfer.

Furthermore, the transfer control unit 230 designates an area (that starting from the address A3) used to store the MAC frame of the subframe SF1 in the main memory 224. Then, the transfer control unit 230 transfers the MAC frame of the subframe SF1 having a length of 134 bytes from FIFO3 in the reception storage unit 231 to the designated area in the main memory 224.

After completion of transfer of data associated with the subframe SF1, the transfer control unit 230 notifies the processor 221 of completion of frame transfer together with the frame CRC check result (information indicating if a CRC is OK or NG) from the FCS unit 233.

At this time, data transfer associated with the subframe SF1 is complete. If the number of bytes of the processed subframes is smaller than the PSDU length, it is considered that the next subframe SF2 will be transferred. In this case, the processor 221 designates a delimiter transfer amount (i.e., 4 bytes) in the transfer control unit 230, and instructs to transfer a delimiter to the data memory 223.

In the subsequent processing sequence, the processing from a timing "A" in FIG. 21 is repeated. When the data amount of the processed subframes reaches the PSDU length at a timing "B" in FIG. 21, ACK frame transmission processing is executed. This processing is the same as that in the first embodiment.

<Effect in this Embodiment>

As described above, the first embodiment can be applied to the reception processing of an aggregation frame. Also, this embodiment can be applied to the second embodiment. That is, in this embodiment, the wireless communication apparatus 200 may include a plurality of processors. Of course, this embodiment may be applied to the third embodiment.

In this embodiment, if it is apparent in an aggregation frame that Ldelimiter$<L_{PSDU}$, the processes in steps S52, S53, and S57 in FIG. 18 may be omitted. However, if unforeseen circumstances are to be considered, it is preferable to execute these processes.

Fifth Embodiment

A wireless communication apparatus according to the fifth embodiment will be described below. In this embodiment, some components in a MAC layer unit 220 in the first embodiment are changed. However, the operation itself of the wireless communication apparatus is the same as that in the first embodiment. Therefore, only differences from the first embodiment will be described below.

FIG. 22 is a block diagram of a wireless communication apparatus 200 according to this embodiment. As shown in FIG. 22, the wireless communication apparatus 200 according to this embodiment corresponds to the arrangement shown in FIG. 1 described in the first embodiment in which a transfer amount decision unit 232 is arranged in a processor 221. In this case, the processor 221 may execute the operation shown in FIG. 6 to function as the transfer amount decision unit 232 when the processor 221 (an arithmetic unit thereof) executes software.

A data storage unit 260 in FIG. 22 corresponds to a reception storage unit 231, transmission storage unit 234, and FCS unit 233 described in FIG. 5. Note that the function of the FCS unit 233 may be implemented when the processor 221 (the arithmetic unit thereof) executes software.

A transfer control unit 230 and the data storage unit 260 execute data transfer via a bus 262, and are also connected to the processor 221. Hence, the transfer control unit 230 can transfer data in the data storage unit 260 to a data memory 223. Also, the bus 262 is connected to a bus 263 via a bus interface unit 261. Then, a main memory 224 is connected to the bus 263. Therefore, the transfer control unit 230 can also transfer data in the data storage unit 260 to the main memory 224.

The operations of the aforementioned blocks are as described in the first embodiment.

<Effect in this Embodiment>

With the arrangement according to this embodiment, the transfer amount decision unit 232 is implemented by a program on the processor. Therefore, a method of deciding a data amount to be transferred can be flexibly changed, and more flexible transfer instructions can be issued to the transfer control unit 230.

Note that in the arrangement shown in FIG. 22, the main memory 224 may be connected to the bus 262. In this case, the need for the bus interface unit 261 and bus 263 can be obviated.

As described above, a wireless communication apparatus 200 according to the first to fifth embodiments includes reception units 210 to 212, a storage unit 231, a transfer amount decision unit 232, and a first transfer control unit 230. The reception units 210 to 212 receive a first frame having a frame length of a first length Lframe using a first wireless method. The storage unit 231 stores a part or whole of the first frame received by the reception units 210 to 212. When a second length Lhead_max decided based on the first wireless method (IEEE802.11) is smaller than the first length Lframe, the transfer amount decision unit 232 sets a third length Lframe_cont to be the second length Lhead_max; when the second length Lhead_max is equal to or larger than the first length Lframe, the unit 232 sets the third length Lframe_cont to be a value equal to or smaller than the first length Lframe. The first transfer control unit 230 transfers transfer information (received frame information) including first information (MAC header) of the third length Lframe_cont included in the first frame to a first memory 223, and transfers the first frame by the first length Lframe to a second memory 224 different from the first memory 223.

According to this arrangement, the transfer amount decision unit 232 and first transfer control unit 230 transfer necessary information to the memories. Also, the transfer amount decision unit 232 decides the size of information to be transferred. Therefore, an access time to the data memory 223 by the processor 221 for MAC header analysis can be shortened. That is, the access time to the memory by the processor 221 can be suppressed from becoming an overhead, and a wireless communication apparatus which can support a plurality of wireless communication methods using a processor can return a response frame within a prescribed time.

Note that the above embodiments have exemplified the case in which the data memories 223 and 243 are arranged inside the processors 221 and 241, and the main memory 224 is arranged outside the processors 221 and 241. However, the embodiments are not limited to this case. More specifically, the data memories 223 and 243 can be those which have higher access speeds from the processor 221 (the arithmetic unit thereof) than the main memory 224. For example, the data memories 223 and 243 may operate at the operation frequencies of the processors 221 and 241, and the main memory 224 may operate at a lower operation frequency. Also, the distances (in other words, wiring lengths or delays) between the data memories 223 and 243 and the processors 221 and 241 may be smaller than the distances (wiring lengths or delays) between the main memory 224 and the processors 221 and 241.

Furthermore, the data memories 223 and 243 may have a shorter latency than the main memory 224. That is, a time (e.g., 1 clock) from when the processors 221 and 241 issue read requests to the data memories 223 and 243 until data are ready to be read out from the data memories 223 and 243 in practice is shorter than a time (e.g., 10 clocks) from when the processors 221 and 241 issue read requests to the main memory 224 until data are ready to be read out from the main memory 224 in practice. The shorter latency consequently means that the processor can rapidly access the memory.

The aforementioned embodiments can be combined as needed. More specifically, for example, in the third to fifth embodiments, a plurality of processors may be arranged. The second to fourth embodiments may be implemented in the arrangement according to the fifth embodiment.

The orders of the flowcharts described in the above embodiments may be replaced as much as possible. Then, the processors 221 and 241 may implement the operations shown in the flowcharts by executing programs. These programs may be stored in the main memory 224 or in a machine-readable media (a memory card, CD-ROM, DVD, etc.). At the time of execution of these programs, they are read out onto the data memories 223 and 243 or the instruction memories 222 and 242.

Furthermore, the above embodiments have exemplified IEEE802.11 and IEEE802.16 as the wireless communication methods. Also, the embodiments are applicable to other communication methods.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus comprising:

a reception unit which receives a first frame with a frame length of a first length using a first wireless method;

a storage unit which stores a part or whole of the first frame received by the reception unit;

a transfer amount decision unit which sets a third length to be a second length when the second length decided based on the first wireless method is smaller than the first length, and sets the third length to be a value not more than the first length when the second length is not less than the first length;

a first transfer control unit which transfers transfer information including first information of the third length to a first memory, and transfers the first frame by the first length to a second memory different from the first memory, the first information being included in the first frame, and a processor which analyzes the first information, wherein the second length is a maximum length of a MAC header specified by the first wireless method, the third length is related to an amount of information transferred to the second memory, and an access speed to the first memory by the processor is higher than an access speed to the second memory by the processor.

2. The apparatus according to claim 1, wherein the first information includes a MAC header of the first frame.

3. The apparatus according to claim 1, wherein the processor supports communication processes specified by a plurality of wireless communication methods by changing software to be executed by the processor.

4. The apparatus according to claim 3, wherein the processor includes a first processor and a second processor, and the apparatus further comprises a second transfer control unit which temporarily stores the transfer information transferred by the first transfer control unit, and transfers the transfer information respectively to the first and second processors.

5. The apparatus according to claim 1, wherein a distance between the processor and the first memory is smaller than a distance between the processor and the second memory, or an operation frequency of the first memory is higher than an operation frequency of the second memory, or latency of the first memory is shorter than latency of the second memory.

6. The apparatus according to claim 1, wherein when the first transfer control unit is notified that the first frame includes a plurality of subframes, the first transfer control unit extracts second information with a fourth length decided based on a frame type in the first wireless method from the first frame in the storage unit, and sets the first length to be a fifth length indicated by the second information, and then decides the third length.

7. The apparatus according to claim 6, wherein the second information includes a delimiter included in one of the subframes.

8. The apparatus according to claim 6, wherein the second information is extracted from each of the subframes, and transfer of the first frame and transfer information thereof is executed using the second information included in each of the subframes.

9. A wireless communication system comprising:

the wireless communication apparatus recited in claim 1, wherein a wireless communication is made by the apparatus.

10. A wireless communication method comprising:

receiving a first frame length of a first frame received using a first wireless method;

comparing the first frame length with a second frame length;

setting a third frame length to be the second frame length when the second frame length is smaller than the first frame length, and setting the third frame length to be a value not more than the first frame length when the second frame length is not smaller than the first frame length;

transferring first information with the third frame length to a first memory, the first information being included in the first frame; and transferring the first frame to a second memory different from the first memory, wherein the second frame length is a maximum length of a MAC header specified by the first wireless method and the third frame length relates to a data size transferred to the second memory, the first information is analyzed by a processor, and an access speed to the first memory by the processor is higher than an access speed to the second memory by the processor.

11. The method according to claim 10, wherein the first information includes a MAC header of the first frame.

12. The method according to claim 10, further comprising:

reading out the first information from the first memory;

analyzing the readout first information; and transmitting a response frame of the first frame.

13. The method according to claim 10, wherein a distance between the processor and the first memory is smaller than a distance between the processor and the second memory, or an operation frequency of the first memory is higher than an operation frequency of the second memory, or latency of the first memory is shorter than latency of the second memory.

14. The method according to claim 10, further comprising:

receiving a second frame which is generated by aggregating a plurality of first frames; and extracting second information from the second frame, wherein when the first frame length is received, the first frame length set to be a fourth frame length included in the second information is received.

15. The method according to claim 14, wherein the second information includes a delimiter included in one of the first frames.

16. The method according to claim 14, wherein the second information is extracted from each of the first frames included in the second frame, and transfer of the first information and the first frame is executed using the extracted second information for each first frame.

* * * * *